(12) United States Patent
Barnett et al.

(10) Patent No.: US 7,482,077 B2
(45) Date of Patent: Jan. 27, 2009

(54) DIRECT HYDROCARBON FUEL CELLS

(75) Inventors: Scott A. Barnett, Evanston, IL (US); Jiang Liu, Evanston, IL (US)

(73) Assignee: Northwestern University, Evanston, IL (US)

( * ) Notice: Subject to any disclaimer, the term of this patent is extended or adjusted under 35 U.S.C. 154(b) by 209 days.

(21) Appl. No.: 10/277,167

(22) Filed: Oct. 21, 2002

(65) Prior Publication Data

US 2003/0118879 A1 Jun. 26, 2003

Related U.S. Application Data

(63) Continuation-in-part of application No. 09/833,209, filed on Apr. 10, 2001, now Pat. No. 6,479,178, which is a continuation-in-part of application No. 09/441,104, filed on Nov. 16, 1999, now Pat. No. 6,214,485.

(51) Int. Cl.
*H01M 8/18* (2006.01)

(52) U.S. Cl. ............................. 429/19; 429/30; 429/33

(58) Field of Classification Search ............ 429/30, 429/33, 19
See application file for complete search history.

(56) References Cited

U.S. PATENT DOCUMENTS

| | | | | |
|---|---|---|---|---|
| 4,894,297 A | * | 1/1990 | Singh et al. .................. | 429/31 |
| 5,273,837 A | | 12/1993 | Aitken | |
| 5,397,657 A | | 3/1995 | Ito et al. | |
| 5,486,428 A | | 1/1996 | Gardner et al. | |
| 5,494,700 A | * | 2/1996 | Anderson et al. ........... | 427/115 |
| 5,516,597 A | | 5/1996 | Singh et al. | |
| 5,554,454 A | | 9/1996 | Gardner et al. | |
| 5,595,833 A | | 1/1997 | Gardner et al. | |
| 5,770,327 A | | 6/1998 | Barnett et al. | |
| 5,925,477 A | | 7/1999 | Ledjeff et al. | |
| 5,989,741 A | | 11/1999 | Bloomfield et al. | |
| 6,106,967 A | | 8/2000 | Virkar et al. | |
| 6,214,485 B1 | * | 4/2001 | Barnett et al. .................. | 429/13 |
| 6,479,178 B2 | | 11/2002 | Barnett | |
| 6,589,680 B1 | * | 7/2003 | Gorte et al. .................... | 429/33 |

FOREIGN PATENT DOCUMENTS

| | | |
|---|---|---|
| EP | 0275356 | 7/1988 |
| EP | 0426265 | 5/1991 |
| WO | WO02/29917 | 4/2002 |
| WO | WO 02/089242 | 11/2002 |

OTHER PUBLICATIONS

Lai, Liu and Barnett, "Patterned Series-Connected Solid Oxide Fuel Cell Arrays"; Materials Science and Engineering Department, Northwestern University, Power Point Presentation, May 2003.
Murray, Tsal and Barnett, "A Direct-Methane Fuel Cell With a Ceria-Based Anode", Letters to Nature, Jun. 18, 1999.
Murray and Barnett, "Operation of Low-Temperature SOFCS on Pure Methane and Ethane Without Carbon Deposition", Electrochem. Soc. Proceed., 99-19:1001-1007.

* cited by examiner

*Primary Examiner*—Bruce F Bell
(74) *Attorney, Agent, or Firm*—Reinhart Boerner Van Deuren s.c.

(57) ABSTRACT

A method of using a hydrocarbon fuel to operate a solid oxide fuel cell, such a cell comprising one or more components which can be prepared using a centrifugal deposition technique of the type described herein.

16 Claims, 23 Drawing Sheets

FIGURE 5

| Fuel | Anode | 500°C | 550°C | 600°C |
|---|---|---|---|---|
| wet ethane | Ni(10)-YDC | carbon-free conditions | | |
| | Ni(20)-YDC | | | |
| | Ni(40)-YDC | | | carbon deposition conditions |
| dry ethane | Ni(10)-YDC | | | |
| | Ni(40)-YDC | | | |

FIGURE 7A
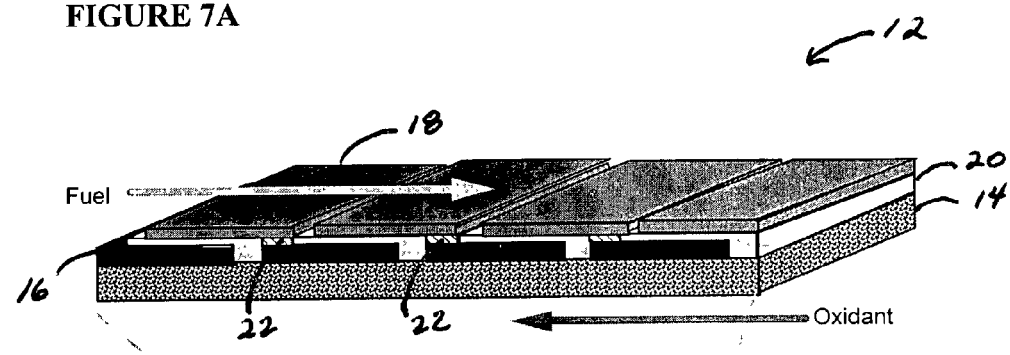
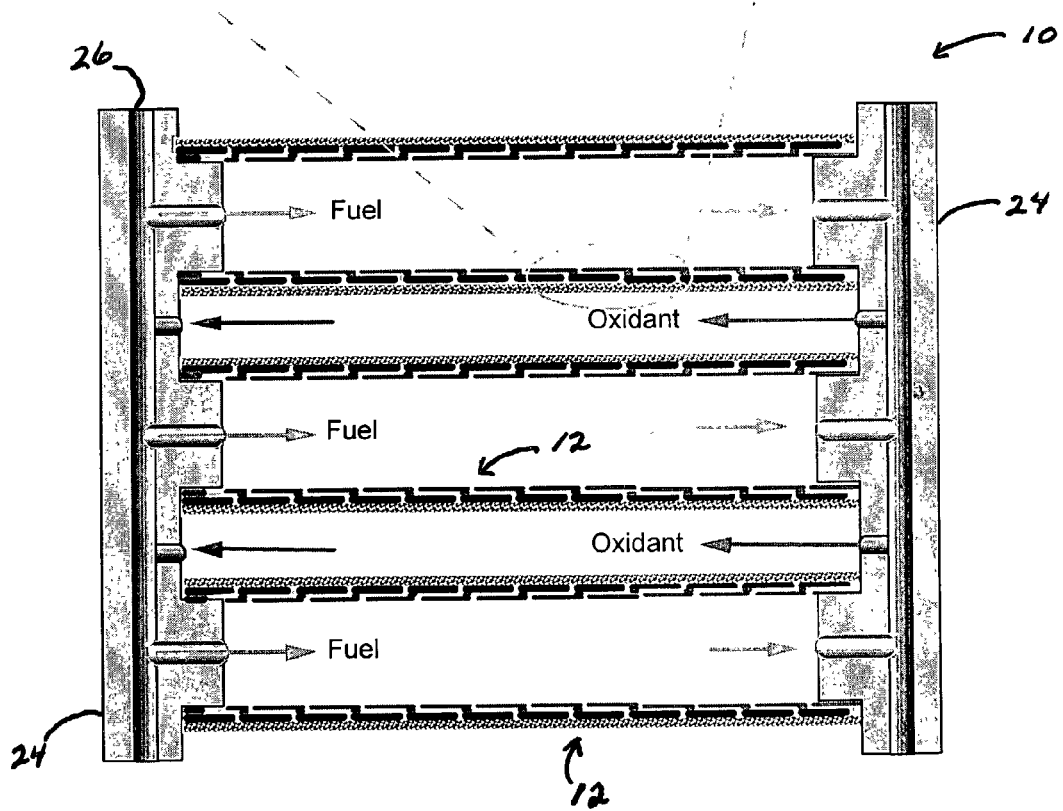
FIGURE 7B

FIGURE 8

- Compare 10cm x 10 cm SOFC and ISOFC
- Assumptions: 0.5 W/cm² at 0.7V, 0.2 Ωcm² contact resistance

|                  | SOFC           | ISOFC         |
|------------------|----------------|---------------|
| Number of cells  | 1              | 45            |
| Single cell area | 100 cm²        | 2 cm²         |
| Voltage          | 0.7V           | 31.5V         |
| Current          | 70A            | 1.4A          |
| Voltage Loss     | 0.14V (20%)    | 0.14V (0.5%)  |

FIGURE 9

$R_\Omega = \rho L^2 / 2 t_e$ $\rho$ = electrode resistivity (LSM $\approx 7 \times 10^{-3}$ $\Omega$cm; Ni-YSZ $\approx 2 \times 10^{-3}$ $\Omega$cm)

L = current path (cell width)

→target: $R_\Omega = 0.05$ $\Omega$-cm$^2$

Calculated electrode thickness $t_e$ (μm):

| Cell Width | Ni-YSZ | LSM |
|---|---|---|
| 0.5 mm | 0.5 | 1.7 |
| 1 mm | 2 | 7 |
| 2 mm | 8 | 25 |
| 4 mm | 32 | 100 |

FIGURE 11

|  | Low T | Very Low T |
|---|---|---|
| Electrolyte | YSZ | Doped Ceria |
| Cathode | LSM | LSCF |
| Anode | Ni-YSZ | Ni-Ceria |
| IC | LSC | LSC |
| Support | PSZ | MgO |

- IC is thin so low $\sigma$ is okay. Replace $(La,Sr)CrO_3$?
- PSZ: TCE close to YSZ, relatively low ionic conductivity, and high fracture toughness.
- MgO: high thermal conductivity, TCE ($13.5 \times 10^{-6}$) close to Ceria ($12.5 \times 10^{-6}$).

DIRECT HYDROCARBON FUEL CELLS

This application is a continuation-in-part of and claims priority benefit from application Ser. No. 09/833,209 filed on Apr. 10, 2001, now U.S. Pat No. 6,479,178 which is a continuation-in-part of and claims priority from application Ser. No. 09/441,104 filed on Nov. 16, 1999, issued as U.S. Pat. No. 6,214,485 on Apr. 10, 2001.

FIELD OF THE INVENTION

This invention relates generally to fuel cells and assemblies, more particularly, cells and components thereof as can be configured for use with hydrogen fuel or the direct oxidation of hydrocarbons.

BACKGROUND OF INVENTION

Fuel cells are promising electrical power generation technologies, with key advantages including high efficiency and low pollution. Most potential near-term applications of fuel cells require the use of hydrocarbon fuels such as methane, for which a supply infrastructure is currently available. However, fuel cells typically operate only with hydrogen as the fuel. Thus, current demonstration power plants and planned fuel-cell electric vehicles must include a hydrocarbon fuel reformer to convert the hydrocarbon fuel to hydrogen. Fuel cells that could operate directly on hydrocarbon fuels would eliminate the need for a fuel reformer, providing considerable system and economic advantages and presumably improving the viability of the technology.

Prior art fuel cells utilizing hydrocarbon fuels directly have encountered significant problems. For example, direct-methanol polymer electrolyte fuel cells produce relatively low power densities and require prohibitively large Pt loading of the anodes. In addition, methanol can permeate the electrolyte. See, for instance, Ren, X., Wilson, M. S. and Gottesfeld, S. High performance direct methanol polymer electrolyte fuel cells. *J. Electrochem. Soc.*, 143, L12-L14 (1996); and Wang, J., Wasmus. S. and Savinell, R. F. Evaluation of ethanol, 1-propanol, and 2-propanol in a direct oxidation polymer-electrolyte fuel cell a real-time mass spectrometry study. *J. Electrochem. Soc.*, 142, 4218-4224 (1995). Furthermore, only alcohol fuels appear feasible with this approach.

Alternatively, prior art solid oxide fuel cells (SOFCs) can utilize hydrocarbons directly via internal or external reforming. In this approach, a hydrocarbon fuel (e.g., methane) is combined with $H_2O$ and/or $CO_2$, which are typically obtained by recirculating the fuel cell exhaust, and introduced directly to the SOFC anode. Commonly used Ni-based anodes provide the catalyst for the endothermic reforming reactions,

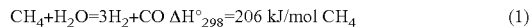

$$CH_4 + H_2O = 3H_2 + CO \quad \Delta H°_{298} = 206 \text{ kJ/mol } CH_4 \quad (1)$$

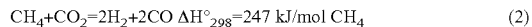

$$CH_4 + CO_2 = 2H_2 + 2CO \quad \Delta H°_{298} = 247 \text{ kJ/mol } CH_4 \quad (2)$$

However, maintaining appropriate gas composition and temperature gradients across a large area SOFC stack is challenging. See, Janssen, G. J. M., DeJong, J. P., and Huijsmans, J. P. P. Internal reforming in state-of-the-art SOFCs. 2nd European Solid Oxide Fuel Cell Forum, 163-172, Ed. by Thorstense, B. (Oslo/Norway, 1996); and Hendriksen, P, V., Model study of internal steam reforming in SOFC stacks. Proc. 5th Int. Symp. on Solid Oxide Fuel Cells, 1319-1325, Ed. by U. Stimming, S. C. Singhal, H. Tagawa, and W. Lehnert (Electrochem, Soc., Pennington, 1997).

For instance, if the reforming reactions are slow, then insufficient $H_2$ is supplied to the SOFCs. On the other hand, fast reforming reactions cause cooling localized near the fuel inlet, leading to poor cell performance, and possible cell fracture. Thus, current SOFC stacks of the prior art do not take full advantage of internal reforming; rather, they employ a combination of ≈75% external and 25% internal reforming of hydrocarbon fuels. See, Ray, E. R. Westinghouse Tubular SOFC Technology, 1992 Fuel Cell Seminar, 415-418 (1992).

SOFCs can in principle operate directly by use of a hydrocarbon fuel. This approach would be desirable since it eliminates the problems with internal reforming mentioned above, and the theoretical maximum fuel efficiency is as good or better than that for reforming. However, prior art attempts with SOFCs operating at temperatures $T_c=900$-$1000°$ C. with methane fuel have been less than satisfactory: either power densities were very low or carbon deposition was observed. See, Putna, E. S., Stubenrauch, J., Vohs, J. M. and Gorte, R. J. Ceria-based anodes for the direct oxidation of methane in solid oxide fuel calls, *Langmuir* 11, 4832-4837 (1995); and Aida, T., Abudala, A., Ihara, M., Komiyama, H. and Yamada, K. Direct oxidation of methane on anode of solid oxide fuel cell. Proc. 4th Int. Symp. on Solid Oxide Fuel Cells, 801-809, Ed. by Dokiya, M., Yamamoto, O., Tagawa, H. and Singhal, S. C, (Electrochem. Soc. Pennington, 1995).

Recently, SOFCs have been developed to produce high power densities with hydrogen at reduced temperatures, $T_c=600$-$800°$ C. See, Huebner, W., Anderson, H. U., Reed, D. M., Sehlin, S. R. and Deng, X. Microstructure property relationships of $NiZrO_2$ anodes. Proc. 4th Int. Symp. on Solid Oxide Fuel Cells, 696-705, Ed. by Dokiya, M., Yamamoto, O., Tagawa, H. and Singhal, S. C. (Electrochem. Soc. Pennington, 1995); daSouza, S., Visco, S J. and DeJonghe, L. C. Thin-film solid oxide fuel cell with high performance at low-temperature. *Solid State Ionics* 98, 57-61 (1997); Fung, K-Z., Chen, J., Tanner, C. and Virkar, A. V. Low temperature solid oxide fuel cells with dip-coated YSZ electrolytes. Proc. 4th Int. Symp. on Solid Oxide Fuel Cells, 1018-1027, Ed. by Dokiya, M., Yamamoto, O., Tagawa, H. and Singhal, S. C. (Electrochem. Soc. Pennington, 1995); Minh, N. Q. Development of thin-film solid oxide fuel cells for power generation applications. Proc. 4th Int. Symp. on Solid Oxide Fuel Cells, 138-145, Ed. by Dokiya, M., Yamamoto, O., Tagawa, H. and Singhal, S. C. (Electrochem. Soc. Pennington, 1995); Godickemeier, M., Sasaki, K. and Gauckler, L. J. Current-voltage characteristics of fuel cells with ceria-based electrolytes. Proc. 4th Int. Symp. on Solid Oxide Fuel Cells, 1072-1081, Ed. by Dokiya, M., Yamamoto, O., Tagawa, H. and Singhal, S. C. (Electrochem. Soc. Pennington, 1995); Tsai, T. and Barnett, S. A. Increased solid-oxide fuel cell power density using interfacial ceria layers. *Solid State Ionics* 98, 191-196 (1997); and Tsai, T., Perry, E. and Barnett, S. Low-temperature solid-oxide fuel cells utilizing thin bilayer electrolytes. *J. Electrochem. Soc.*, 144, L130-L132 (1997). However, until recently, such systems were not considered or used for direct-hydrocarbon operation, because carbon deposition reaction rates decrease with decreasing temperature.

SOFCs and related stacking configurations have undergone considerable development over the past decade. Tubular-cell-based technologies appear to be a promising approach for SOFC stacking. Tubular stacks avoid sealing and manifolding problems inherent to planar stacks, but take a large volume for a given cell active area and can show significant ohmic losses related to current transport around the tube circumference through the $(La,Sr)MnO_3$ (LSM) cathode. Another problem is the relatively poor mechanical toughness of LSM.[N. M. Sammes, R. Ratnaraj, and C. E. Hatchwell, *Proceedings of the 4th International Symposium on Solid Oxide Fuel Cells*, Ed. By Dokiya, O. Yamamota, H.

Tagawa, and S. C. Singhal (Electrochemical Society, Pennington, 1995) p. 952. B. Krogh, M. Brustad, M. Dahle, J. L. Eilertsen, and R. Odegard, *Proceedings of the 5th International Symposium on Solid Oxide Fuel Cells*, Ed. By U. Stimming, S. C. Singhal, H. Tagawa, and W. Lehnert (Electrochemical Society, Pennington, 1997) p. 1234.] This is typical of SOFC ceramic materials, which are optimized for electrical properties rather than mechanical toughness.

Alternatively, planar stacks can provide higher power-to-volume ratios than tubular stacks, but are not as mechanically robust as tubes and require excellent seals. Another problem with many planar stack designs is that they require pressure contacts between separate SOFC and interconnect plates. This places stringent requirements on the flatness of large-area ceramic plates, making manufacturing difficult and expensive. Furthermore, there are often relatively high resistances associated with these contacts, which deleteriously affect stack performance. It is clear that a choice between tubular and planar stacks involves trade-offs. Even so, the disadvantages associated with each respective approach present obstacles for effective use of SOFCs and suggest a new direction is needed to better utilize and benefit from this technology.

OBJECTS OF THE INVENTION

There are a considerable number of problems and the deficiencies associated with the use of hydrocarbons with solid oxide fuel cells. There is a demonstrated need for the use of such fuels in an efficient, economical fashion so as to improve the viability of the related technology.

Accordingly, it is an object of the present invention to provide various solid oxide fuel cells and/or components which can be used with hydrocarbon fuels thereby overcoming various deficiencies and shortcomings of the prior art, including those outlined above. It will be understood by those skilled in the art that one or more aspects of this invention can meet certain objectives, while one or more other aspects can meet certain other objectives. Each objective may not apply equally, in all instances, to every aspect of the present invention. As such, the following objects can be used in the alternative with respect to any one aspect of the present invention.

It can be an object of the present invention to increase the rate of hydrocarbon oxidation so as to increase and/or otherwise provide useful power densities. Such densities can be increased and/or provided utilizing various catalytic metals in the fabrication of fuel cell anodes, such anodes as can be used in conjunction with a ceria material.

It can be an object of the present invention to utilize solid oxide fuel cells and/or components thereof for low temperature direct hydrocarbon oxidation.

It can also be an object of the present invention to provide various anodes and related cellular components having small particle size obtainable by sputter deposition processes and/or related fabrication techniques.

It can also be an object of the present invention to provide a method for hydrocarbon oxidation, at a temperature lower than 800° C. and/or at a temperature for a specific hydrocarbon whereby there is no carbon deposition.

It can also be an object of the present invention to improve the viability of solid oxide fuel cells, both those described herein as well as those otherwise known in the art, through use of a unique assembly of such cells having a configuration and/or geometry of the type described herein. In particular, it is an object of this invention to provide a cell geometry/configuration whereby all active fuel cell components and interconnects are deposited as thin layers on an electrically insulating support.

It can also be an object of the present invention, in conjunction with one or more of the preceding objectives, to provide a geometry/configuration for an assembly of solid oxide fuel cells whereby assembly design and choice of support material can enhance mechanical durability and thermal shock resistance. A related objective is to decrease overall material cost by providing all cell-active materials in thin layer/film form.

It can also be an object of the present invention to improve a number of solid oxide fuel cell performance or function parameters through integration of the cell components and interconnects on a common support, such advantages including reduction of electrical resistances and interconnect conductivity requirements. As described more fully below, such integration can be accomplished through use of the thin film/layer configurations and related geometries described herein.

Another object of this invention is to provide a cell assembly configuration suitable for SOFCs of the type described herein, especially those operable at low temperatures for direct oxidation of hydrocarbon fuels, such cells as can be prepared to preferentially incorporate the catalytic metal anodes of this invention.

Other objects, features, benefits and advantages of the present invention will be apparent from the following summary and descriptions, and will be readily apparent to those skilled in the art made aware of this invention and having knowledge of various and solid oxide fuel cells in the use of hydrocarbon fuels. Such objects, features, benefits and advantages will be apparent from the above as taken in conjunction with the accompanied examples, tables, data and all reasonable inferences to be drawn therefrom.

SUMMARY OF THE INVENTION

The present invention provides for the operation of SOFCs using hydrocarbon fuels over a range of temperatures. High power densities were obtained via direct hydrocarbon use, without carbon deposition. The results shown herein can be extendable to fuel cell stack operation. In particular and without limitation, the present invention demonstrates the feasibility of direct hydrocarbon electrochemical oxidation in novel low-temperature solid oxide fuel cells. For instance, power densities up to 0.37 W/cm$^2$ were measured for single cells that were operated at 650° C. with atmospheric-pressure air as the oxidant and pure methane as the fuel. The measured power densities are competitive with fuel cells operated on hydrogen. As discussed more fully below, such results can be obtained at low operating temperatures ($T_c$<800° C.) and/or by incorporating ceria in the anodes of such cells.

In part, the present invention is a method of using a solid oxide fuel cell for direct hydrocarbon utilization. The method includes (1) providing a catalytic metal anode and a ceria material contacting the anode and (2) introducing a hydrocarbon fuel to said cell, said fuel absent carbon dioxide and/or water in an amount sufficient to convert the hydrocarbon fuel to hydrogen under cell operating conditions. As such, the method is absent a hydrocarbon reforming stage.

The anode of the solid oxide fuel cell can be constructed using a metal catalytic for the cracking of hydrocarbons. Such a metal includes but is not limited to Pt, Ru, Pd, Fe, Co and Ni present at weight percentages of the type described elsewhere herein. Various embodiments of the present invention can also include a doped lanthanum chromite, doped strontium titanate, or other electronically-conducting oxides. Various other preferred embodiments, including oxidation of lower molecular weight hydrocarbons, utilize nickel.

In preferred embodiments of the present invention, the ceria material includes a dopant. Such dopants include but are not limited to various oxides of yttrium, gadolinium and samarium. Highly preferred embodiments include a yttria-doped ceria, having the stoichiometric relationship of $(Y_2O_3)_x(CeO_2)_{1-x}$, where "x" can be about 0.1 to about 0.25. One such embodiment is $(Y_2O_3)_{0.15}(CeO_2)_{0.85}$, although other such stoichiometries would be known, to those skilled in the art made aware of this invention, to provide a similar or comparable functional result.

With reference to use of a nickel metal and only by way of example, the catalytic anode can comprise a nickel composite. Such a composite can further include ceria and/or zirconia materials or layers of such materials used in conjunction with the nickel metal. Zirconia can be introduced to such a composite as an electrolyte adjacent to and/or contacting the anode. In preferred zirconia embodiments, various dopants can also be utilized, such dopants including but not limited to calcium, scandium, and yttrium. As would be well-known to those skilled in the art and made aware of this invention, other electrolytes can be used, including ceria, strontium-doped lanthanum gallium magnesium oxide, any of which can be doped as discussed elsewhere herein.

The method of the present invention provides for direct utilization and/or oxidation of hydrocarbon fuels, substantially without any reformation reaction. Fuels especially suitable for use herein include, without limitation, $C_1$-$C_8$ alkanes, and the corresponding alcohols. Likewise, combinations of such hydrocarbons can be utilized with good effect, some mixtures for the purpose of approximating natural gas compositions.

Accordingly, this invention can also include use of such hydrocarbon fuels with a variety of catalytic metal-electrolyte composites, anodes and/or related fuel cells. In the past, conventional SOFCs with thin yttria stabilized zirconia (YSZ) electrolytes on Ni-YSZ anode supports were shown to provide power densities of 1 W/cm$^2$ or higher at operating temperatures of ≈800° C. Both the high power densities and the reduced operating temperatures are advantageous for practical SOFC power plants. While most of the work on such cells has been with hydrogen fuel, high power density operation of anode-supported cells was recently demonstrated using methanol. See, Y. Jiang and A. V. Virkar, J. Electrochem. Soc. 148 (2001) A706. And, as discussed herein, SOFCs can also work with dry or slightly (3%) humidified methane using ceria-containing anodes to increase methane oxidation rates. Alternatively, SOFCs with nickel-scandia stabilized zirconia (Ni-ScSZ) anodes have been operated with low-humidity methane at higher temperatures, e.g. 1000° C., without coking. See, e.g., K. Ukai, Y. Mizutani, Y. Kume, and O. Yamamoto, in: H. Yokokawa, S. C. Singhal (Eds.), Solid Oxide Fuel Cells VII, Electrochemical Society, Pennington, N.J., 2001, p. 375. The higher operating temperatures and the ScSZ-containing anodes apparently increased methane oxidation rates, while coking was suppressed by the high oxygen ion flux arriving at the anode during cell operation.

However, as shown below, conventional Ni-YSZ anode cells can also operate on hydrocarbons such as methane. (See, i.e., examples 6 and 23-29.) Further, as natural gas compositions comprise methane in combination with various mixtures of higher hydrocarbons, a range of such combinations and/or natural gas compositions can also be utilized with conventional anodes and/or related SOFCs. Cells demonstrating this utility were prepared, for purposes of illustration, using either lanthanum strontium cobalt iron oxide-gallium doped ceria (LSCF-GDC) or LSM-YSZ cathodes. Power densities of nearly 1.0 W/cm$^2$ at open circuit voltages of up to 1.165 V were obtained with both methane and natural gas fuels at 800° C., as shown below.

As mentioned above and demonstrated below, the present invention also includes a method of using a hydrocarbon fuel to operate a solid oxide fuel cell. Such a method includes (1) providing a solid oxide fuel cell having an anode comprising a catalytic metal, such an anode having, optionally, a ceria material of the type described herein in contact therewith; and (2) introducing a hydrocarbon fuel to the anode, the fuel absent carbon dioxide, water and/or oxygen in an amount sufficient to convert the fuel to hydrogen under cell operating conditions. As such, as also described above, such a method is substantially absent a hydrocarbon reforming stage. The anode of the solid oxide fuel cell can be constructed as otherwise provided herein. Preferably, the anode comprises nickel present at weight percentages of the type described elsewhere herein and/or as would be understood by those skilled in the art of fabricating solid oxide fuel cells. As a departure from various other embodiments of this invention, such an anode component can be distinguished as without use of a ceria material in contact therewith. Reference is made, for instance, to the comparative test results of example 6 wherein a representative hydrocarbon fuel (e.g., methane) was utilized in conjunction with a more typical or conventional anode of the art, one including a composite of nickel and yttria-stabilized zirconia, operated in conjunction with a corresponding electrolyte. As described elsewhere herein and as would be understood by those skilled in the art, such a cell can be arranged and configured for operation in a stack or battery of such cells, and operated with a hydrocarbon fuel.

As demonstrated below, a range of hydrocarbon fuels can be used in conjunction with this invention. Such fuels include, without limitation, about $C_1$, $C_2$, $C_3$ or $C_4$ . . . about $C_{10}$ hydrocarbons and/or alkanes, either alone (e.g., methane or ethane) or as provided in the context of various possible combinations or mixtures (e.g., a natural gas composition). More generally, such fuels include those which can be vaporized or dispersed, or have sufficient vapor pressures, under anode compartment temperatures. Other fuels utilized include ethers and alcohols corresponding to such hydrocarbons, such as but not limited to dimethyl and diethyl ether, methanol and ethanol. JP8, a kerosene-type mixture of hydrocarbons, is also used with good effect.

More specifically, in contrast to the prior art and use of hydrogen, this invention can also include use of a hydrocarbon fuel to increase the open circuit voltage of a solid oxide fuel cell. Such a method includes (1) providing a solid oxide fuel cell as described above; (2) introducing a hydrocarbon fuel to the anode, to operate the cell; and (3) increasing the operating temperature of the cell. Enhanced performance is especially notable and can be observed at operating temperatures above about 600° C. Reference is made to Examples 28-29 and the corresponding data and figures. Again, a preferred anode can comprise nickel, but other such catalytic metals can be used with good effect. Likewise, such an anode can be preferably used in conjunction with a zirconia material introduced during anode fabrication so as to provide a metal composite and/or an electrolyte adjacent thereto. Enhanced anode/cell performance is demonstrated below using, alternatively, methane and a natural gas composition. However, as would be understood by those in the art and made aware of this invention, comparable benefits are available with other hydrocarbon fuels of the sort described herein.

Regardless of fuel utilized, the present invention also includes a method of preparing or fabricating a solid oxide fuel cell component. Such a method includes (1) preparing a slurry of a material from which a component is to be fabricated; (2) providing a support or substrate with the slurry in a centrifuge apparatus; and (3) applying centrifugal force to the slurry and support/substrate, the force sufficient to deposit the component material on the support/substrate. Such a method can be used in the fabrication of a variety of solid oxide fuel cell components. In various preferred embodiments, an anode material and/or an electrolyte material can be deposited in sequence upon a suitable support/substrate. In various other embodiments, the supporting substrate comprises an anode or cathode component, for deposition of an electrolyte slurry thereon. Regardless, multiple depositions can be used to control or enhance component dimension.

The liquid medium of such a slurry can include an alcohol, water and a corresponding variety of mixed solvent systems. Various other organic or mixed solvents can be used, as would be understood by those skilled in the art, depending upon a particular component material. Accordingly, a variety of ketones and other polar organic solvents can be used alone or with a corresponding range of mixed solvent systems. Drying of the deposited component (e.g., anode and/or electrolyte) can be used to remove the slurry liquid medium, followed by sintering leaving a uniform material coating of component density suitable for use in conjunction with solid oxide fuel cell.

In part, the present invention is also a method of using a ceria material to increase hydrocarbon oxidation rates in a solid oxide fuel cell. The inventive method includes (1) providing a solid oxide fuel cell having an anode composite of a catalytic metal and a ceria layer, (2) operating the cell at a temperature less than about 800° C., (3) introducing a hydrocarbon fuel directly to the anode and (4) sorbing oxygen with the ceria layer for transfer to the anode for hydrocarbon oxidation. Solid oxide fuel cells can be constructed and/or fabricated using methods and techniques well-known to those skilled in the art, together with use of the cell components otherwise as described more fully herein. In preferred embodiments, the hydrocarbon is methane, ethane or a combination thereof, although other fuels can include those previously discussed. Irrespective of the choice of hydrocarbon fuel, preferred embodiments of such a method include operating the cell, together with its anode, at a temperature between about 500° C. and about 700° C.

In part, the present invention is also a method for suppressing and/or eliminating carbon deposition during electrochemical oxidation of a hydrocarbon in a fuel cell. The method includes (1) providing a solid oxide fuel cell anode composite of a catalytic metal and a ceria layer, (2) operating the cell at a temperature less than about 800° C., (3) introducing the hydrocarbon directly to the anode and (4) oxidizing the hydrocarbon at the anode substantially without carbon deposition on the anode. As with other aspects of the present invention, this method can be effected using fuel cells of the prior art and/or as constructed and/or fabricated as elsewhere described herein. In particular, but without limitation, the anode comprises a catalytic metal selected from the group consisting of Pt, Ru, Pd, Fe, Co and Ni. Regardless, preferred embodiments include introducing oxygen electrochemically at the anode at a rate and pressure sufficient to react the oxygen with any elemental carbon present, whereby carbon monoxide disproportionation and/or hydrocarbon pyrolysis are inhibited. While operating pressures less than 800° C. provide the desired effect, such embodiments can be employed beneficially at lower temperatures, typically between about 500° C. and about 700° C., depending on the anode material and/or the hydrocarbon oxidized.

In part, the present invention is also an anode for direct hydrocarbon oxidation in a solid oxide fuel cell. The anode includes (1) a composite having a catalytic metal and a ceria material (2) such that the metal is present in an amount less than about 60 weight percent of the anode. Catalytic metals of the present invention include those known to those skilled in the art as useful for the cracking and/or oxidation of hydrocarbons. In preferred embodiments, such a metal can include those of the type described more fully above. Regardless, the ceria material can be used with or without a dopant. In any event, the anode of this invention is substantially without carbon deposits under cell operating conditions. At lower metal levels, the present invention contemplates use of a current collector as needed to supplement conductivity.

High power density SOFCs and related methods of this invention operate by direct electrochemical hydrocarbon oxidation without carbon deposition. The anodes described herein provide for rapid hydrocarbon electrochemical oxidation rates. The results, confirmed with a simple thermodynamic analysis, show that SOFC stacks can be operated in the temperature range from ≈500 to 700°-800° C. without carbon deposition. Direct oxidation provides a desirable method for utilizing a variety of hydrocarbon fuels, avoiding the difficulties associated with reforming. Indeed, this may be the only feasible approach for low-temperature SOFCs, since extrapolation of internal reforming rate data below 750° C. suggests that reforming rates become prohibitively small.

In part, the present invention is a solid oxide fuel cell stack and/or composite configuration, including: (1) a substantially planar, electrically-insulating substrate; (2) a plurality of cathode components on the substrate, each cathode component spaced one from another; (3) an electrolyte on and between each cathode; (4) a plurality of anode components, each anode spaced one from another and corresponding in number to the plurality of cathode components; and (5) an interconnect component contacting the portion of each cathode component and a portion of each corresponding anode component. Such a configuration provides for fuel and oxidant cavities as shown, for instance, in FIG. 7B. Alternatively, a plurality of anode components can be deposited on a substrate, with a corresponding number of cathode components interconnected therewith.

In preferred embodiments, the solid oxide fuel cell composite includes a catalytic metal anode and a ceria material contacting the anode, as described more fully above, for direct hydrocarbon oxidation. In such embodiments, the catalytic metal includes, but is not limited to, Pt, Ru, Pv, Fe, Co and Ni present at weight percentages of the type described elsewhere herein. Other embodiments, preferred or otherwise, can be utilized with comparable effect depending upon the type of fuel. Regardless, preferred embodiments of such fuel cell composites include a doped ceria material. Highly preferred embodiments include a yttria-doped ceria having a stoichiometric relationship such as that provided elsewhere herein.

In part, the present invention can also include a solid oxide fuel cell assembly, including: (1) a substantially planar array of fuel cells on a substrate, each cell having cathode, anode, electrolyte and interconnect component structures, with each component structure of each cell having a sub-planar arrangement of one to another; (2) an oxidant cavity adjacent the substrate; and (3) a fuel cavity adjacent the sub-planar anode arrangement. As discussed above, and as further described in example 14, an assembly configured with anodes on a substrate will provide a converse cavity placement; i.e., a fuel cavity adjacent the substrate and an oxidant cavity adjacent the anodes. Fuels and oxidants useful with such cells and related assemblies are as described herein or otherwise known in the art. Likewise, the requisite cavities and supporting cellular/assembled structures will be understood upon consideration of various aspects of this invention.

A preferred embodiment of such an assembly is illustrated in several of the following figures. In particular, a plurality of such planar arrays, configured with the corresponding oxidant and fuel cavities can provide a stacking configuration such as that portrayed in FIG. 7B.

In part, the present invention is also a method of constructing a series of solid oxide fuel cells, such cells as can be used in conjunction with the composites and/or assemblies described above. Such a method, without limitation, includes one or more of the following constructions: (1) providing a substrate with masks aligned thereon in a predetermined pattern; (2) placing/depositing a first electrode material on the substrate; (3) re-aligning the masks on the first electrode materials, one mask on each such first electrode material; (4) placing/depositing an electrolyte material on the first electrode material; (5) removing the masks and placing/depositing an interconnect material on the first electrode material; and (6) re-aligning the masks on the electrolyte and placing/depositing a second electrode material on the electrolyte.

Such electrode/electrolyte and/or interconnect components can be prepared and integrated on a substrate and with one another as described herein, using thin-film/layer techniques of the prior art, such techniques and straight-forward modifications thereof as would be understood by those skilled in the art made aware of this invention. Successive masking, deposition, and unmasking procedures can be employed to deposit/print cathode, electrolyte, interconnect and anode components on a suitable insulating substrate. Such procedures or fabrication steps would also be known to those skilled in the art, modified as necessary to accommodate use of the component materials described herein or to otherwise achieve the functional and/or performance characteristics desired. Fabrication in this manner on a suitable substrate, provides a planar composite, array and/or assembly of solid oxide fuel cells wherein the cells are integrated one with another. (See, for example, FIG. 7A.) The cellular stacking geometries of this invention have, therefore, the capacity to be two- or three-dimensional. Such procedures can be viewed as analogous to various thin-film/layer techniques used in the fabrication of micro- and nano-dimension integrated devices, hence the reference to integration and integrated stacks.

Individual planar, integrated assemblies can be mounted one above another and between structural components described elsewhere herein and as necessary to provide a functional fuel cell. Such end-plates/caps, fuel feed tubes and associated non-conductive seals are of well-known material choice and construction, the design of which can be as shown in FIG. 7B or, in accordance with this invention, as necessary to provide the desired performance property or parameter.

As discussed above, SOFCs are a very promising energy conversion technology for utilization of fossil fuels and hydrocarbons produced therefrom. The present invention introduces a novel stacking geometry devised to enhance the benefits available from this technology. The geometry involved has all active SOFC components and the interconnect deposited as thin layers on an electrically insulating support. This configuration allows the choice of a support material that provides optimal mechanical toughness and thermal shock resistance. The supports can be in the form of flattened tubes, providing relatively high strength, high packing densities, and minimizing the number of seals required. The integration of SOFCs and interconnects on the same support provides several other advantages including the reduction of electrical resistances associated with pressure contacts between the cells and interconnects, relaxation of fabrication tolerances required for pressure contacts, reduction of ohmic losses, and reduction of interconnect conductivity requirements. The materials used in the integrated stacks of this invention can be similar to or the same used with conventional SOFCs, and long-term stable operation will be achievable. Use of thin layer cell-active components helps to lower overall material costs.

Without limitation as to the scope of this invention and irrespective of the fuel (hydrogen or hydrocarbon) used, the following provides several advantages, attributes and/or aspects pertaining to one or more embodiments of the stacking configurations, geometries and/or assemblies described herein.

1. The support is not an electrically active part of the stack; it can be designed chosen for optimal mechanical properties.
2. There are no separate interconnect pieces, and a reduction in the number of seals is possible. The cells can be fabricated in the form of flattened tubes, such that a seal-less design similar to tubular stacks can be implemented while retaining the high power-to-volume ratios of planar stacks.
3. Because the SOFC components and interconnects are in intimate contact, electrical losses related to pressure contacts are greatly reduced, improving stack performance.
4. Because no separate interconnect pieces and fewer gas-flow channels are required, there is a reduction in stack volume and weight.
5. Large integrated stack elements can be made by increasing the number of cells: there is no need to make very large area cells.
6. Considerable flexibility is provided by way of stack design: for example, individual cell sizes can be varied slightly to account for spatial variations in gas composition and temperature.

BRIEF DESCRIPTION OF THE DRAWINGS

FIG. 5 is a table showing conditions that limit and promote carbon deposition, as compared to various Ni-YDC anodes and the parenthetical reference to Ni weight percent therein. While such percentages are shown with respect to ethane and nickel-based anodes, the same can be extented with comparable effect to other anode metals and the direct oxidation of other hydrocarbons, as would be well known to those skilled in the art and made aware of this invention.

FIG. 7A shows an enlarged schematic view of an integrated stack element showing the cell-interconnect geometry.

FIG. 7B illustrates a hydrogen (or hydrocarbon) flow cavity can be created between two such stack elements by sealing at the edges. The addition of end-caps that include fuel-feed tubes results in a fully sealed geometry.

FIG. 8 provides a comparison of various performance properties and parameters associated with a typical solid oxide fuel cell (SOFC), as described, and an integrated solid oxide fuel cell (ISOFC) of this invention.

FIG. 9 demonstrates another aspect of the present invention, low lateral resistance loss and reduction thereof with cell width, as can be illustrated with Ni-YSZ and LSM cathodes.

FIG. 11 provides and compares representative materials for the cell components of this invention.

DETAILED DESCRIPTION OF PREFERRED EMBODIMENTS

Figures 1A, 1B:
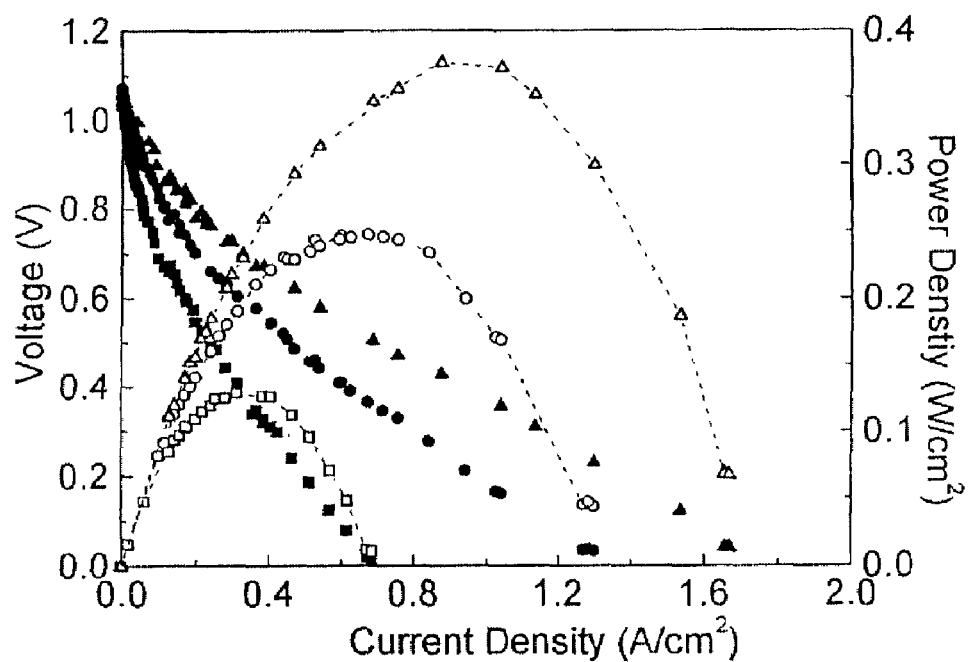
FIG. 1A illustrates cell voltage and power density vs. current density for an SOFC operated on air and methane.
FIG. 1B provides variations in operating temperature for the cell of FIG. 1A and the respective voltage and power densities observed therewith and as shown in FIG. 1A. The measurements were collected in atmospheric pressure air, and methane fuel was supplied at ~50 cm$^3$ STP min$^{-1}$.

One schematic perspective view of an SOFC stack, in accordance with this invention, is shown in FIGS. 7A and 7B. An array of SOFCs 12, connected in series by thin-film interconnects 22, are deposited onto a porous, insulating support 14. The layers 12 can be deposited in the order: electrode (cathode or anode), electrolyte, interconnect, and electrode (cathode or anode). The patterning is such that electrolyte 20 and interconnect 22, which are both dense layers, are continuous and form a gas-tight seal over the entire surface. With respect to FIGS. 7A and 7B, the electrodes, cathode 16 and anode 18 are porous layers separated by electrolyte 20, and connected by interconnect 22. Alternatively, and as elsewhere described more fully, anodes can be positioned on the substrate and interconnected with cathodes.

By contrast, in conventional planar stacks, the current flows between separate SOFC and interconnect pieces: the stacking order is hydrogen (fuel)-SOFC-oxygen-interconnect-hydrogen (fuel)-SOFC, and so forth. The polarity of the SOFCs must be maintained in order for additive voltages. In the stacks 10 of this invention, however, the current flows across the integrated stack elements. There is no requirement that the pieces be stacked with the same polarity, such that the cells can be mounted in opposite directions as shown schematically in FIG. 7B: that is, a stacking order of fuel-SOFC-oxygen-SOFC-fuel-SOFC, etc. There are no separate interconnect pieces, and the gas-flow volume per unit generator area is reduced by a factor of ≈2.

FIGS. 7A and 7B illustrate a straightforward approach in which the individual planar integrated stack pieces 12 are mounted between end plates 24 and feed tubes 26, requiring seals between the stack pieces and end plates. An alternative approach is the deposit of cells on both sides of unistructure closed-end flattened tubes 26, using well-known ceramic techniques, eliminating the need for seals, such as those used in tubular stacks.[S. C. Singhal, *Proc. 6th Intl. Symp. Solid Oxide Fuel Cells*, Ed. By S. C. Singhal and M. Dokiya (Electrochemical Society, Pennington, N.J. 1999), p. 39.] On the other hand, the present invention provides the high power-to-volume ratios of planar stacks.

As described above, the SOFC stacking of this invention can include patterned layers. As would be understood by those skilled in the art, patterning can be performed during deposition and, as a result, no additional process steps are required. In particular, masking is readily incorporated and used with sputter deposition. Colloidal spray deposition processes are also contemplated in conjunction with contact masks, especially ultrasonic sprays which produce very small (20-40 μm) droplets.[A. Q. Pham, T. H. Lee, and R. S. Glass, *Proc. 6th Intl. Symp. Solid Oxide Fuel Cells*, Ed. By S. C. Singhal and M. Dokiya (Electrochemical Society, Pennington, N.J. 1999), p. 172.] The design, assembly and resulting configuration of this invention can provide several distinct advantages:

1. Improved mechanical strength and toughness. The devices are deposited onto an electrically insulating ceramic that can be chosen for desired strength, toughness, thermal conductivity, and thermal expansion match to cell components. Partially-stabilized zirconia is a preferred choice based on its high toughness [T. Yoshida, T. Hoshina, I. Mukaizawa, and S. Sakurada, J. Electrochemical Society, 146, 2604 (1989)] and good thermal expansion match. Other materials with lower electrical conductivity and higher thermal conductivity may also be advantageous.

2. Simplified gas manifolding and sealing. The stacking geometry shown in FIG. 1 would require seals like other planar stacks. However, a flattened tube design allows simple gas manifolding as in various tubular stacks of the prior art.[S. C. Singhal, *Proc. 6th Intl. Symp. Solid Oxide Fuel Cells*, Ed. By S. C. Singhal and M. Dokiya (Electrochemical Society, Pennington, N.J., 1999.] That is, one gas is introduced through a feed tube into the closed-end flattened tube, and the other is fed to the outside. No sealing is required, or a single seal at the tube end can be used.

3. Small volume and weight. The design eliminates the separate interconnect pieces present in most planar stacks, and at the same time reduces the number of gas-flow channels by a factor of two. These changes reduce the volume and weight required to generate a given amount of power.

4. Reduced internal electrical losses. The integrated stack features intimate contact of electrodes with interconnects, eliminating the resistance loss associated with the pressure contacts used in many planar stacks.[B. Krogh, M. Brustad, M. Dahle, J. L. Eilertsen, and R. Edegard, *Proceedings of the 5th International Symposium on Solid Oxide Fuel Cells*, Ed. By U. Stimming, S. C. Singhal, H. Tagawa, and W. Lehnert, (Electrochemical Society, Pennington, 1997) p. 1234.] While pressure contacts to both ends of the integrated stack elements are required for current collection, the subdivision of the cell area into a large number of small series-connected cells results in relatively low currents and high voltages, such that losses at these contacts are minimal. Compare, for example, a 10 cm×10 cm single cell with the same size integrated stack element. (See, FIG. 8.) Assuming a single cell producing 0.5 W/cm$^2$ at an operating voltage of 0.7V, the total current is 70A. On the other hand, the same area integrated stack with 45 2-mm-wide cells and 0.2-mm-wide interconnects will run at 22.5 V and ≈2A. Assuming 2-mm-wide current collector strips at either end of the integrated stack, the collector current density would be the same as for a conventional cell. Thus, an ≈1 Ω cm$^2$ contact resistance would yield ≈0.5V drop at the contact: this would roughly halve the power density from the single cell, but would have negligible effect on the integrated stack.

Another consideration is the lateral resistance loss across the electrodes. The resistance loss is given by $\rho L^2/2t_e$, where $\rho$ is the electrode resistivity, L is the length of the current path (i.e. the cell width), and $t_e$ is the electrode thickness. This relationship clearly shows that small cell widths minimize ohmic losses. For example, a LSM cathode ($\rho \approx 10^{-2}$ Ωcm) with L=2 mm and $t_e$=20 μm yields 0.1 Ω-cm$^2$. This value is reasonably low even for this very thin electrode, and can be reduced further by reducing the cell width or increasing thickness. (See, FIG. 9.)

5. The unit cell size is very small in one direction, ≈2 mm, and is several cm in the other. Scaleup of the stacks would involve primarily increasing tube length and number of cells, and perhaps a slight widening of the tubes, such that there would be little change in the unit cell size. This will be very favorable in the scaleup stage of stack development, compared with conventional planar stacks where the individual cell area must be increased.

6. This invention provides considerable flexibility in stack design. For example, stack performance can be optimized by varying individual cell widths along the gas flow direction. The variation would be used to compensate for variations in gas composition and cell temperature along the length of the tubes.[See, for example, H. Yakabe, T. Ogiwara, I. Yasuda, and M. Hishinuma, *Proc. 6th Intl. Symp. Solid Oxide Fuel Cells*, Ed. by S. C. Singhal and M. Dokiya (Electrochemical Society, Pennington, N.J. 1999), p. 1087.] For example, since a lower-temperature region would likely have lower current densities, the cell widths would be increased slightly to retain the same current per cell.

As mentioned above, the present invention includes fabrication and/or methods for the construction and assembly of the stacking geometries and configurations described herein. As a point of contrast and comparison, consider techniques of the prior art: a tubular version of series-interconnected cells, where individual cells and interconnects were deposited in bands around calcia-stabilized zirconia (CSZ) support tubes. A major difficulty was obtaining patterned deposits with methods such as thick-film slurry coating and electrochemical vapor deposition (EVD). For example, a Ni-YSZ layer was slurry coated, then patterned by chemical etching. Electrolyte and interconnect layers were patterned by first covering selected areas with a loosely-bound powder, depositing the coating, and then mechanically scraping away the powder and the attached thick-film deposit. Disadvantages of these methods include the difficulty in scaling them into reliable mass production steps, the poor spatial resolution that led to relatively large unit cell sizes (1 cm), and the cycling to high temperature (≈1500° C.) required for each deposition step.

Figure 12:
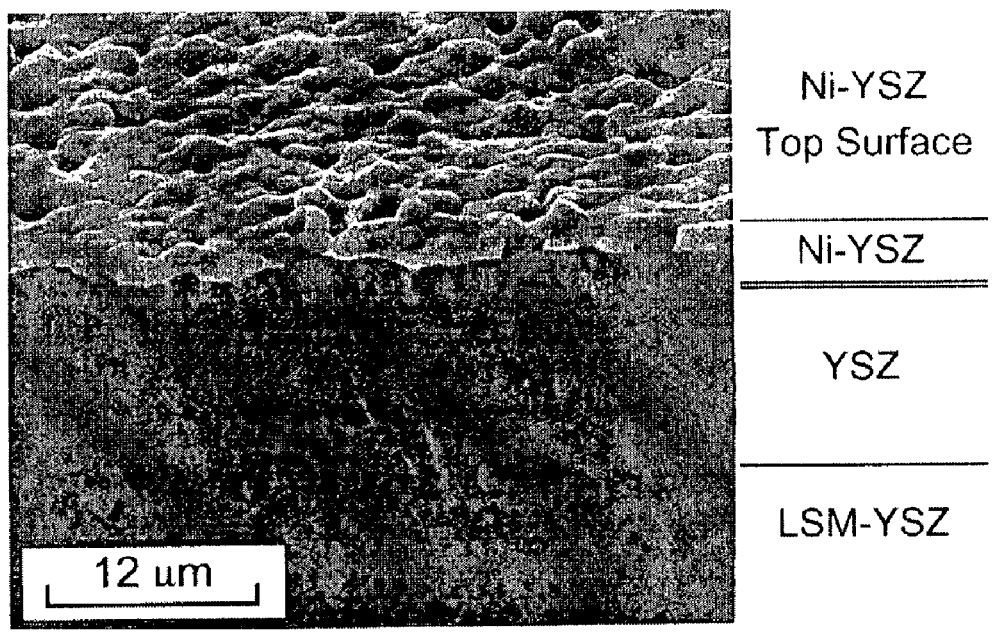
FIG. 12 is an SEM fracture cross-sectional image of a typical thin-electrolyte SOFC showing LSM-YSZ substrate, YSZ electrolyte, and Ni-YSZ anode (the thin YDC layer is not visible).

Techniques recently developed for preparing low-to-medium temperature SOFCs, which typically involve thin (5-10 μm) electrolytes, are ideally suited for and can be readily applied to making the components, composites and stacks of this invention. Thin electrolytes and electrodes have been prepared using various colloidal deposition and sintering processes,[K. Z. Fung, J. Chen, C. Tanner, and A. V. Virkar, *Proc. 4th Intl. Symp. Solid Oxide Fuel Cells*, Ed. by M. Dokiya, O. Yamamoto, H. Tagawa, and S. C. Singhal (Electrochemical Society, Pennington, 1995) p. 676. S. deSouza, J. S. Visco and L. C. DeJonghe, *Solid State Ionics*, 98, 57 (1997)]. Tape calendaring and sintering, and sputter deposition methods are also well-known, reported in the pertinent literature and can be used to prepare such components. FIG. 12, for example, shows a cross-sectional SEM image of a typical sputter-deposited cell of the type available through prior art fabrication and now applicable to this invention, where the YSZ electrolyte and Ni-YSZ electrode were sputter deposited using such techiques. It is well known that sputter deposition can produce patterned thin films by depositing through shadow masks. Similarly, some of the colloidal processes such as spray deposition also can be used for patterned deposition.

Shadow masking is a simple technique for making patterned deposits. Mechanisms for accurately aligning shadow masks over planar substrates are readily available. As discussed above, it is desirable to have relatively small width cells. Feature sizes down to 0.1 mm are easily achieved, such that relatively small (e.g. 1-2 mm wide) cells can be prepared. Using the patterning techniques employed for banded-tublar SOFCs, it was more difficult to achieve the desired size reduction; 1-cm wide cells were used in those stacks, but this size does not provide the low ohmic loss observed with the present invention.

Cell component materials in the integrated stacks, geometries and configurations of this invention can be largely the same as those used in conventional SOFCs: YSZ electrolyte, LSM cathode, and Ni-YSZ anode. The same type of variations used to improve performance, e.g. addition of YSZ to the LSM cathode or ceria to the anode, can be employed, such variations including those discussed elsewhere herein. The interconnect material can be doped LaCrO$_3$ (LSC). As the interconnect conductivity required in an inventive stack is much lower than in conventional stacks (the interconnect layer is only several microns thick), alternate materials with lower conductivity than LSC can be used. Reference is made to Example 13 and FIG. 11.

An important aspect of an integrated stack is the support material. In prior work on the tubular banded cells, the support was calcia-stabilized zirconia, providing the advantage of excellent thermal expansion match with the YSZ electrolyte and other cell materials. However, the ionic conductivity was a problem because it tended to shunt the cells. In response thereto, another feature of this invention, distinct from the banded-tubular prior art, is low operating temperature, which minimizes support shunting. Another "problem" with zirconia is the poor thermal conductivity, which limits thermal shock resistance. Accordingly, support components of this invention can comprise materials overcoming such concerns, including but not limited to MgO and PSZ, partially-stabilized zironia.

As mentioned above, the present invention could be used in any fuel cell application, including the full range of commercial applications which can be expected of fuel cells. A particular application of this stacking approach is for making small fuel cell power supplies for portable applications, especially those incorporating the low temperature cells of the type described elsewhere herein.

EXAMPLES OF THE INVENTION

The following non-limiting examples, data and referenced graphics illustrate various aspects and futures relating to the cell apparatus, assemblies, configurations and methods of this invention, including the surprising and unexpected results showing utility of hydrocarbon fuels at low temperature without carbon deposition. Comparable utilities and advantages can be realized using other embodiments, consistent with this invention. For instance, while numerous examples illustrate this invention through use of methane and ethane, other hydrocarbons including the corresponding alcohols can be used with equal effect through straight-forward modifications of this invention and related fuel cell components, such modifications as would be well known to those skilled in the art and made aware of this invention.

The SOFCs used in several examples were fabricated using techniques well-known in the art. In particular, several embodiments were utilized, but comparable results are available using other such electrodes and electrolytes, including those described herein. In some preferred embodiments for use with several examples, SOFCs were fabricated on porous $La_{0.8}Sr_{0.2}MnO_3$ (LSM) cathodes. The LSM pellets were ≈2 cm in diameter and 1 mm thick, and were produced using standard ceramic processing techniques. All SOFC layers, starting with a 0.5 μm-thick $(Y_2O_3)_{0.15}(CeO_2)_{0.85}$ (YDC) porous film, were deposited on the LSM pellet using dc reactive magnetron sputtering. The electrolyte, 8 mol % $Y_2O_3$-stabilized $ZrO_2$ (YSZ), was subsequently deposited under conditions yielding a dense 8 μm thick film. To complete the cell, another 0.5 μm-thick YDC film was deposited, followed by a porous, 2 μm-thick Ni-YSZ anode.

Anode reactions were studied using impedance spectroscopy with anodes that were sputter deposited onto both sides of bulk YSZ single-crystal electrolytes. Data was collected in various fuel environments at the indicated temperatures.

Example 1

Single-cell current-voltage measurements were carried out in air and methane. Identical results were obtained for pure and humidified (containing 3% $H_2O$) methane in the early stages of cell tests; while cell performance was stable with dry methane, after ≈2 hrs of testing in humidified methane, cell performance degraded because of oxidation of the anode Ni. FIG. 1 shows the measured current density and power density vs. voltage. The open-circuit voltage (OCV) was 1.06V. The current density vs. voltage curves were non-ohmic indicating a substantial electrode overpotential. Based on prior studies of these cells operated on hydrogen fuel, the current densities were limited primarily by cathode, overpotential. Current densities increased with increasing temperature, such that maximum power density increased from 250 $mW/cm^2$ at 600° C. to 370 $mW/cm^2$ at 650° C.

Example 2

By way of comparison, the results of Example 1 were similar to those obtained for cells operated with humidified hydrogen fuel, except that the power densities were ≈20% greater. Visual observation, energy dispersive x-ray (EDX), and scanning electron microscopy (SEM) observations of the anodes, carried out after the call tests, showed no evidence of carbon deposition after ≈100 hrs of operation.

Example 3

Successful cell operation on dry methane (Example 1) indicated that direct electrochemical oxidation, $CH_4 + 2O_2 = 2H_2O + CO_2$ $\Delta G°(600° C.) = -800$ kJ/mol (3) was the primary anode reaction mechanism. The OCV values measured in Example 1, ≈1.06V, were typically very close to the values measured for these cells operated with 97% $H_2$+3% $H_2O$ fuel. This is reasonable given that the $\Delta G°(600° C.)$ values are similar for eqn. 3 and hydrogen oxidation. The exact Nernst potential for eqn. 3 cannot be calculated since the, $H_2O$ and $CO_2$ partial pressures are not known, but the measured $OCV_s$ suggest reasonable values, <0.18 atm for $H_2O$ and <0.09 atm. $CO_2$.

While eqn. 3 shows electrochemical oxidation of methane, it should be noted that the present invention contemplates the possibility of other reaction mechanisms for the desired oxidation products. For instance, various intermediate reactions and/or species can exist enroute to complete oxidation under cell operating conditions. While eqn. 3 illustrates methane oxidation, equations can be provided to portray oxidation of other hydrocarbons discussed herein, likewise accounting for and including the presence of various other intermediate reaction mechanisms and/or species.

Example 4

It is unlikely that hydrocarbon reforming played a role in the cell operation of Example 1, and if so, only after $H_2O$ and $CO_2$ were produced by reaction (3). Discounting such an occurrence, reforming rates were probably too low to contribute significantly to the anode reaction, because of the small anode area (≈1 $cm^2$) and low temperature. Furthermore, the relatively high fuel flow rates used invariably flush any reformation reactants and products from the anode compartment.

Example 5

Figure 2:
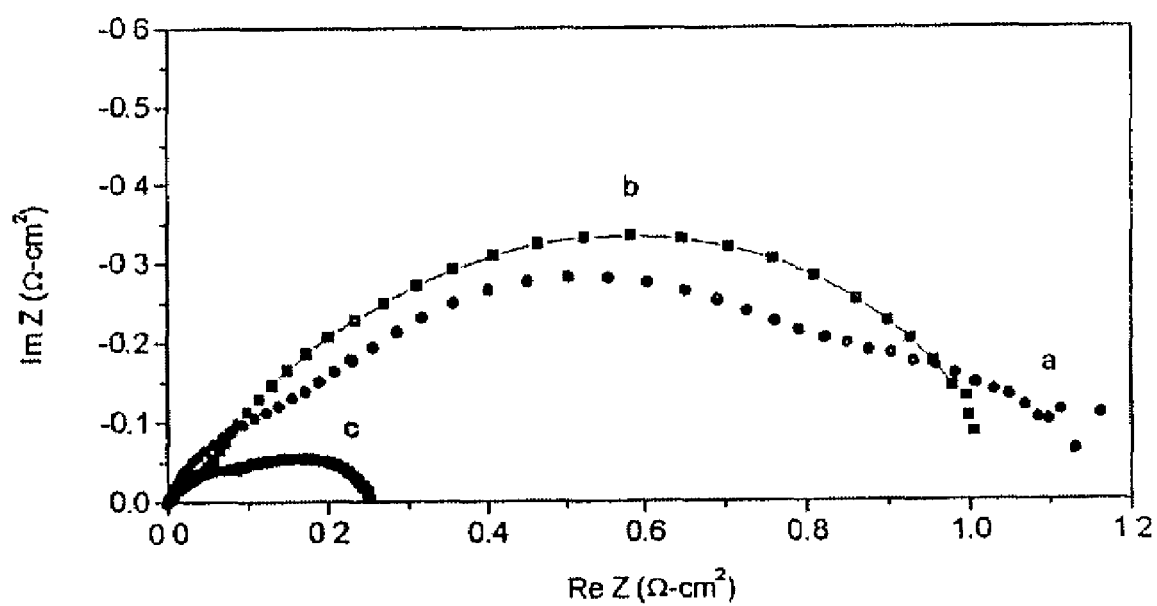
FIG. 2 shows a comparison of electrode impedance spectra for Ni-YSZ/YDC anodes measured at 600° C. in (a) 97% $CH_4$+3% $H_2O$, (b) 3% H2+3% $H_2O$+94% Ar, and (c) 97% $H_2$+3% $H_2O$.

Direct hydrocarbon oxidation is further evidenced by impedance spectra (FIG. 2) obtained from the above-described Ni-YSZ/YDC anodes in humidified methane (a) and humidified dilute $H_2$ (b). An 3% $H_2$+3% $H_2O$+94% Ar mixture, which was used to simulate a slightly reformed methane fuel (b), yielded electrode arcs with a much different shape than those for methane, indicating that the primary anode reaction with methane was not oxidation of hydrogen produced by reforming. Also shown in FIG. 2 is the impedance result for the anode operated in 97% $H_2$+3% $H_2O$ (c). This electrode arc was much smaller than that for methane, indicating a lower anode overpotential and explaining why the SOFC current densities were higher for hydrogen than methane.

Example 6

Figure 3:
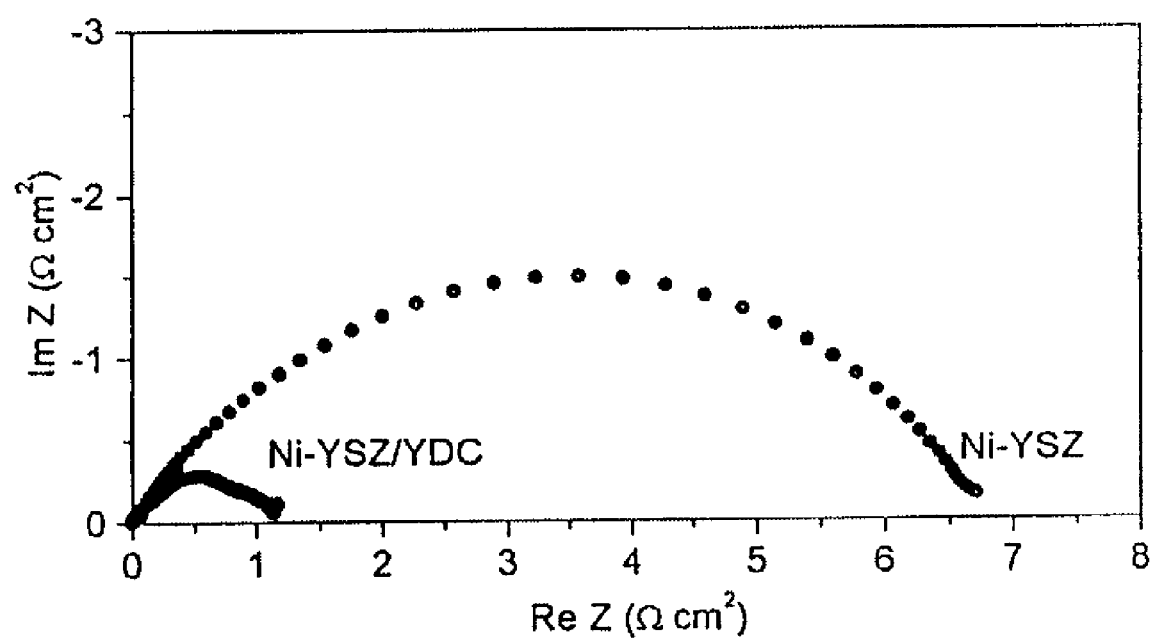
FIG. 3 compares impedance spectroscopy results for Ni-YSZ and Ni-YSZ/YDC anodes in 97% $CH_4$+3% $H_2O$ at 600° C.

It is thought that one factor contributing to the rapid direct electrochemical oxidation of methane at these temperatures is the anodes employed in the SOFCs and, in particular a combination of Ni-YSZ and YDC layers. This is illustrated in FIG. 3, which compares the impedance spectra taken in humidified methane for Ni-YSZ/YDC and Ni-YSZ anodes. The YDC layer causes a factor of ≈6 decrease in the electrode resistance. This observation is consistent with prior studies indicating that ceria promotes hydrocarbon oxidation. Without restriction to any one theory or mode of operation, ceria is believed to be beneficial for several reasons. First, it becomes a mixed conductor in a reducing fuel environment, a condition which should expand the reaction zone beyond three-phase boundaries. Second, the ionic conductivity of ceria is higher than that of YSZ, which improves the transport of oxygen ions from the electrolyte to the anodes. Third, ceria is known to readily store and transfer oxygen. The present invention also indicates that the oxygen storage capability of ceria can be enhanced by the addition of zirconia. Preferred embodiments include anodes with two ceria/zirconia interfaces where enhanced oxygen storage can, in this manner, increase methane/hydrocarbon oxidation rates.

Example 7

Another result observed from the cell tests of this invention was the absence of carbon deposition. In general, carbon deposition can occur by methane pyrolysis,

$$CH_4 = C + 2H_2, \tag{4}$$

or disproportionation,

$$2CO = C + CO_2, \tag{5}$$

On the other hand, the oxygen flux arriving at the anode during SOFC operation tends to react with any carbon, suppressing carbon deposition. The role of methane pyrolysis was tested by flowing pure methane over SOFC anodes, without SOFC operation, such that no reaction products were present. No carbon deposition was observed at <700° C., and the amount of carbon deposited increased only with increasing temperature above 700° C., showing carbon deposition via methane pyrolysis does not occur readily at low temperatures.

Example 8

Figure 4:
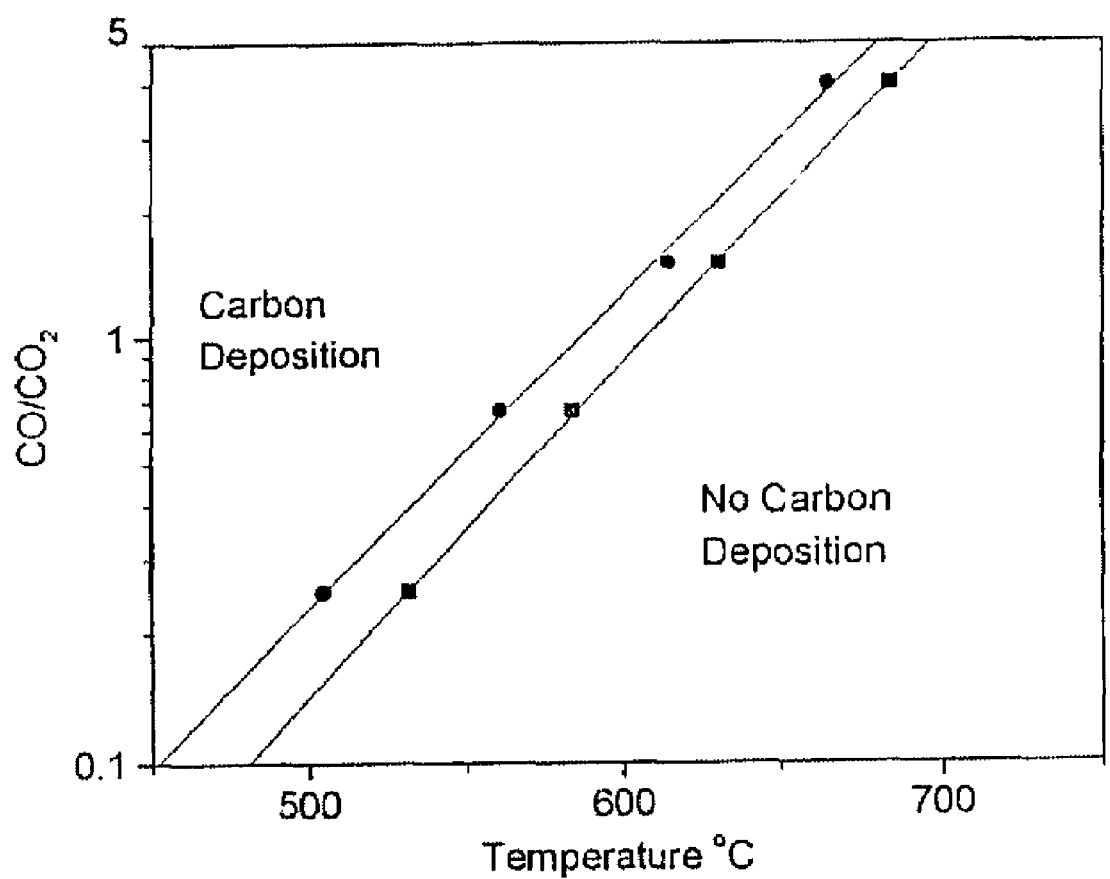
FIG. 4 shows CO/$CO_2$ ratios calculated at equilibrium with graphitic carbon (•$P_{CO}$+$P_{CO2}$, 0.1 atm; and ■ $P_{CO}$+$P_{CO2}$, 0.2 atm) based on reaction (5), in Example 7.

During cell operation, product gases are present in the anode compartment, raising, at least, the possibility of carbon deposition via reaction (5). However, as noted above, the present cell tests provide data for nearly pure hydrocarbon in the anode compartment, perhaps due to the small-area cells and relatively high fuel flow rates resulting in small concentrations of reaction products. Even so, consideration was given to the situation encountered in a SOFC stack, where the products of reactions (1)-(3) would be present at substantial partial pressures. Thus, a simple equilibrium calculation was done to determine the conditions where one might expect carbon deposition free stack operation in $CO-CO_2$ mixtures. FIG. 4 shows the $CO/CO_2$ partial pressure ratio at equilibrium with graphitic carbon (eqn. 5) vs. temperature, for two $CO+CO_2$ total pressures. For sufficiently low $CO/CO_2$ ratios, carbon deposition will not occur. The optimal temperature range for SOFC stack operation on dry methane is ≈500-700° C. If the temperature is <500° C., carbon deposition proceeds by reaction (5) unless $CO/CO_2$ ratios are very low. While temperatures ≧700° C. would tend to suppress carbon deposition by reaction (5), they would allow carbon deposition by direct pyrolysis of methane (eqn. 4).

Example 9

Some internal reforming would be necessary in a SOFC stack to produce a small amount of CO and $H_2$. However, carbon monoxide and hydrogen gas would balance the $CO_2$ and $H_2O$ produced by direct oxidation, preventing exceedingly low $CO/CO_2$ and $H_2/H_2O$ ratios where the anode Ni may oxidize.

Example 10

Ethane fuel reactions were studied in SOFC's with anodes of low Ni content. Various cells were made using Ni-YDC anodes containing 10, 20 and 40 weight percent Ni. The porous Ni-YDC anodes were ≈2 μm-thick. The cell structure and processing was similar to that described above, except that the cathode was an LSM-YSZ mixture. In order to identify carbon-free operating conditions, the Ni-YDC anodes were tested in ethane fuel environments at temperatures ranging from 500-700° C.

Ethane oxidation was studied at Ni-YDC anodes using low Ni concentrations intended to limit carbon deposition. FIG. 5 summarizes carbon deposition results at the various Ni-YDC anodes exposed to dry and wet (3% $H_2O$) ethane from 500-600° C. These reaction studies were made without cell operation and indicate the onset of carbon deposition for the given conditions. In wet ethane, anodes with lower Ni content (10-20 wt %) were more resistant to carbon deposition at higher temperatures. For dry ethane fuel, carbon deposition occurred even for low temperatures and anodes with low Ni content. These observations show that carbon-deposition-free cell operation can be conducted using wet ethane with any of the above anode compositions at 500° C., and up to 550° C. for anodes with 10-20wt % Ni.

Example 11

Figure 6:
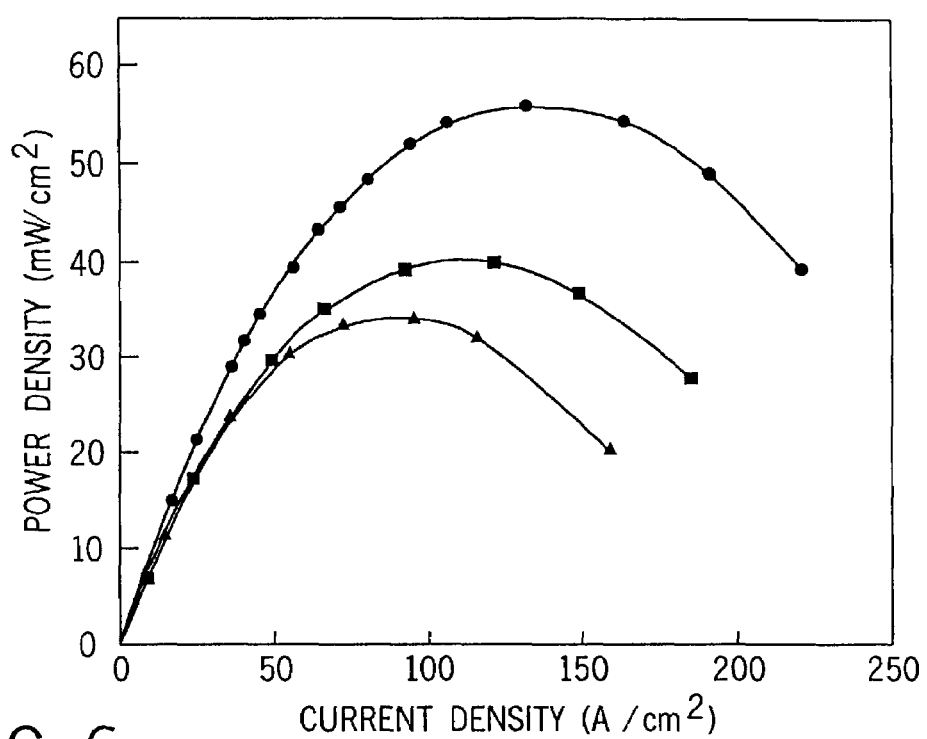
FIG. 6 compares cell power density vs. current density for a solid oxide fuel cell operated on air and ethane.

Current voltage measurements of cells were taken under operating conditions that avoided carbon deposition. The performance of a cell operating with wet (3% $H_2O$) ethane fuel at 500° C. (▲) is illustrated in FIG. 6 and compared to wet hydrogen 92% hydrogen (●) and humidified dilute (94% Ar) hydrogen (■). In this case the Ni-YDC anode contained 40 wt % Ni. The cell current densities were relatively low because of the low temperature. Current densities for ethane fuel were typically about 35% less than for hydrogen fuel. A maximum of ≈35 mW/cm² was obtained with ethane. No carbon deposition was detected. Carbon-deposition-free cell operation with anodes of lower Ni content (10-20 wt %) was achieved up to 600° C., which is beyond the temperature range indicated by the carbon reaction studies given in FIG. 5. This suggests that the oxygen flux arriving at the anode during cell operation reacted with any carbon, thereby suppressing carbon deposition. However, cell power densities were somewhat low in these cells, either because of low anode electrical conductivity or low Ni catalyst content.

Example 12

Figure 10:
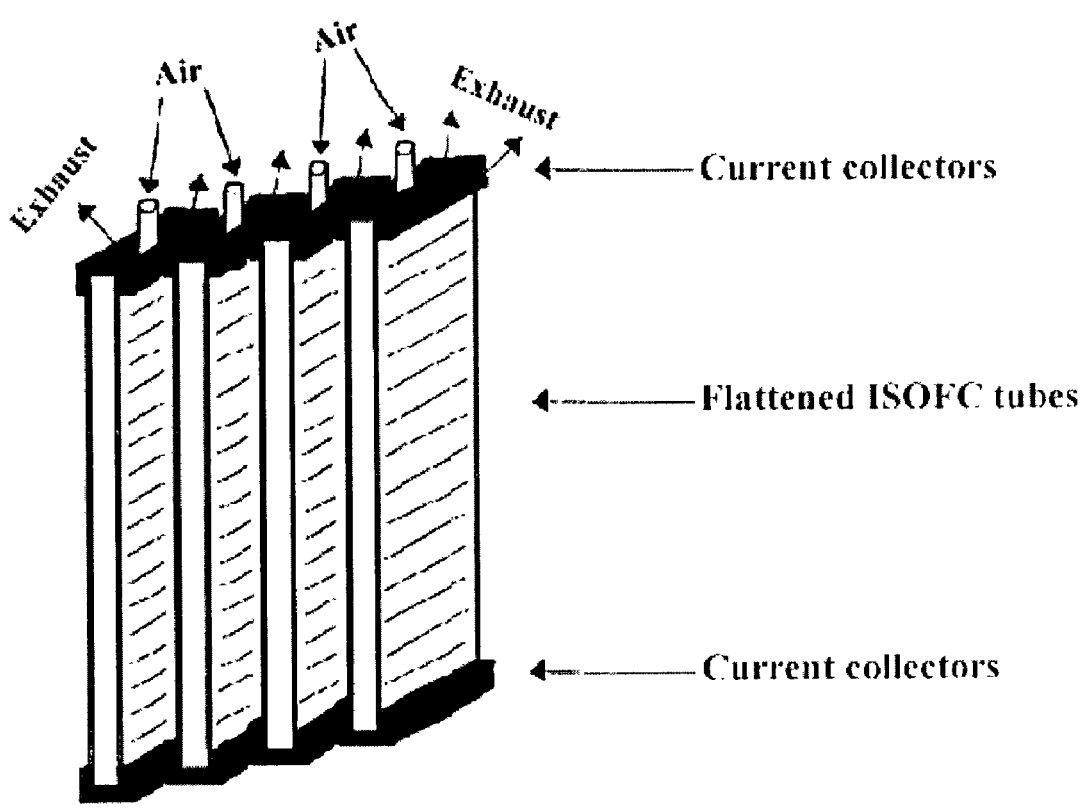
FIG. 10 is a schematic illustration of stacked integrated solid oxide fuel cells, in accordance with this invention, showing in particular, the structural relationship and placement of various cell assembly components such as current collectors and fuel tubes.

With reference to FIGS. 7A and 7B, the solid oxide fuel cell components of this invention can be stacked as shown in FIG. 10. Flattened support tubes allow high volume densities and minimize sealing problems. The integrated configurations eliminate interconnects and reduce the number of flow fields by two, relative to planar fuel cells of the prior art. Because the integrated arrays are not in contact, heat conductors can be inserted therebetween; this can help eliminate thermal gradients and improve efficiency through reduction of cooling requirements. Current flows along the surfaces of the fuel cell rather than between separate components thereof.

Example 13

With reference to FIGS. 7A, 7B and 10, the fuel cell components and material composition thereof can be selected according to performance and function parameters desired. FIG. 11 provides construction profiles of two such fuel cells of this invention, as designed according to desired/relative operating temperatures. Such cells, in accordance with the broader aspects of this invention, can be integrated as described herein and incorporated into an assembly of such cells. Various other material choices and component constructions would be well-known to those skilled in the art and made aware of this invention, depending upon a particular performance property or parameter desired. Such designs and constructions are limited only by the availability of a desired component material to be used in conjunction with thin layer fabrication techniques.

Example 14

Figure 13:
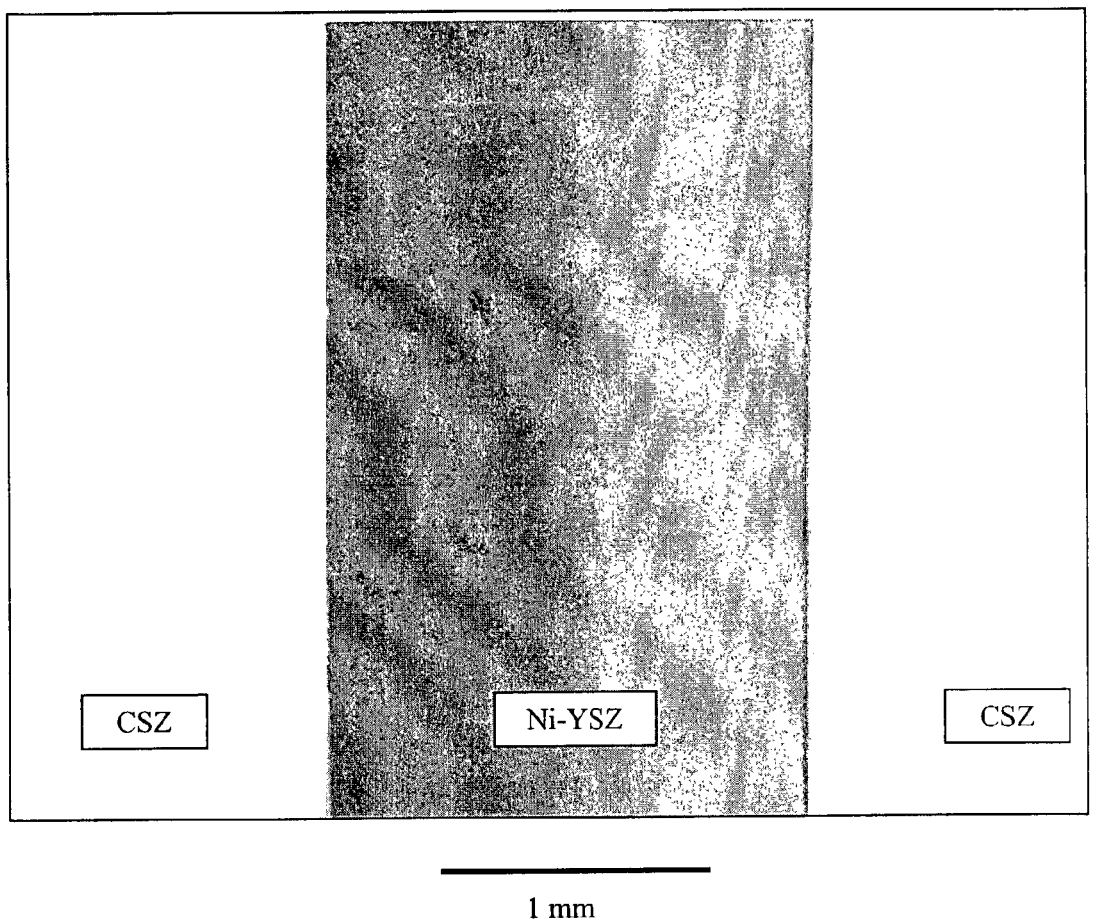
FIG. 13 is an optical micrograph showing a portion of a patterned NiO-YSZ anode layer on a CSZ support.

Current procedures can involve first depositing anode material, followed by electrolyte. After high temperature sintering, interconnect and cathode layers are applied and sintered at a lower temperature. Thin Ni-YSZ anodes and YSZ electrolytes are deposited using a colloidal processing technique called centrifugal casting. In this method, a partially-sintered Ca-stabilized Zirconia (CSZ) ceramic pellet (the support for the ISOFC) is immersed in a slurry, based on water or acetone, that contains the appropriate powder. Patterning is achieved simply by placing an adhesive polymer mask on the pellet. The pellet and slurry are then placed in a centrifuge where centrifugal forces are used to rapidly deposit the powder onto the pellet surface, yielding high quality, high packing density Ni-YSZ or YSZ coatings. The layers and support are co-sintered in air at 1400-1500° C. FIG. 13 shows an optical microscope image of a patterned Ni-YSZ strip after sintering. The layer is uniform with a low-defect-density and well-defined patterned edges.

Example 15

A key issue in the processing of example 14 is the drying stress caused by the liquid evaporating from the thin Ni-YSZ and YSZ layers. The film shrinkage during drying can cause cracking, and is generally worse for thicker films and smaller particle sizes. The process described herein uses nano-scale YSZ for the electrolyte to reduce sintering temperatures. It produced several micron thick YSZ films in single step. Multiple deposition steps were used to make thicker layers. Another aspect of this process is co-sintering. Fuel cells require a thin dense YSZ layer with porous cathodes, anodes, and support. Difficulties can include matching shrinkages (to avoid cracking of the layers and/or sample curvature) and maintaining electrode porosity at the high temperatures required for YSZ sintering.

Figure 14:
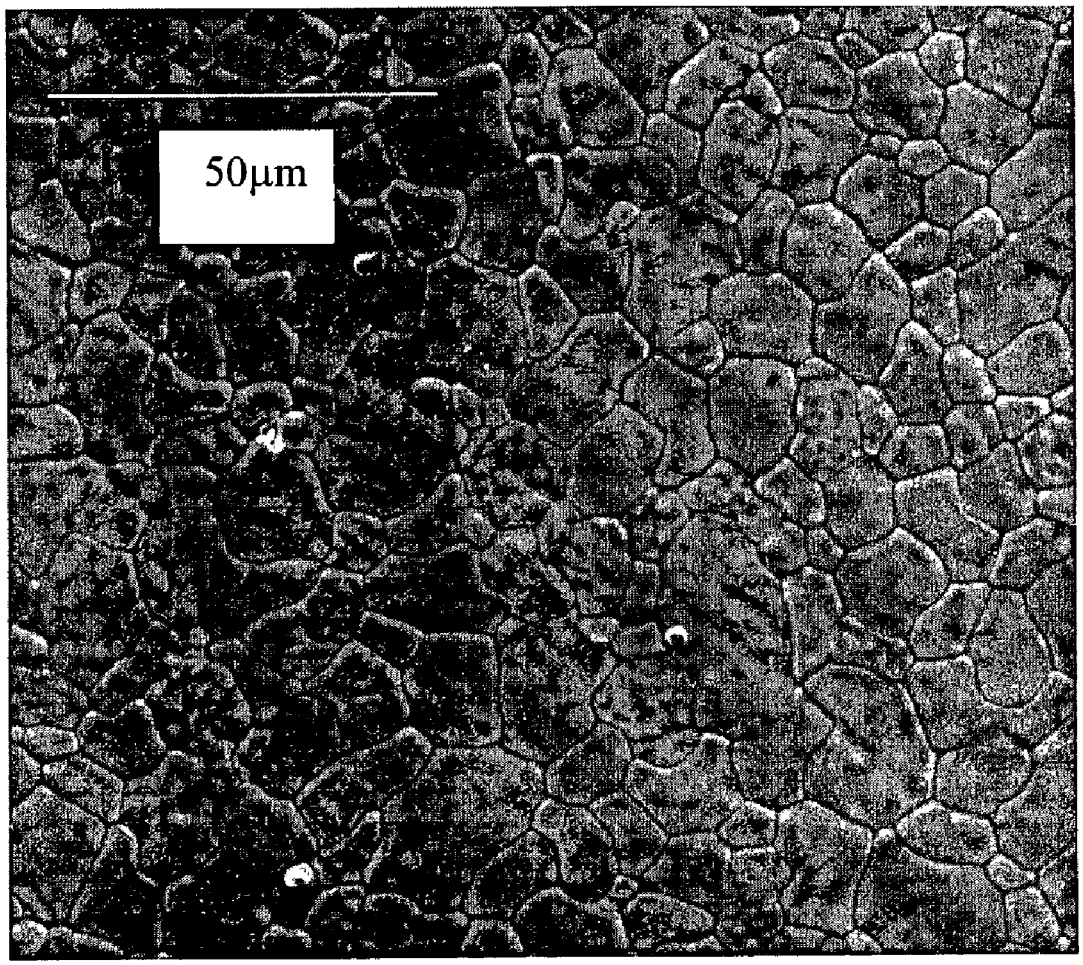
FIG. 14 is an SEM micrograph of the top surface of a sintered YSZ layer.
Figure 15:
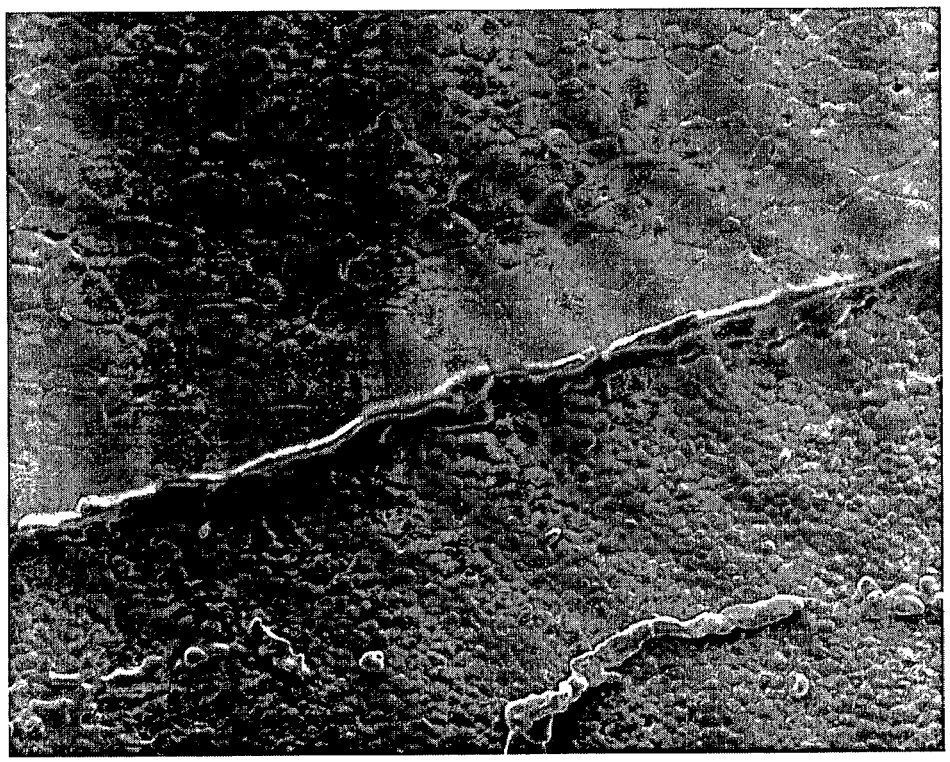
FIG. 15 is an SEM micrograph showing the masked edge of a YSZ electrolyte on Ni-YSZ. The Ni-YSZ (lower part) can be distinguished from the YSZ layer (upper part) by its smaller grain size.

High temperature sintering at 1500° C. resulted in high quality dense YSZ electrolytes. An SEM image of the top surface of atypical YSZ layer is shown in FIG. 14. The YSZ layer is clearly dense and defect free, with a large grain size. The shrinkages were matched well: no cracking or curvature of the samples was observed. FIG. 15 shows a SEM image of a portion of a patterned YSZ film. The YSZ film is seen in one region while the other region while the uncovered Ni-YSZ anode can be seen in another region. This result, along with that shown in FIG. 13, demonstrates successful fabrication of patterned anode and electrolyte layers.

Example 16

The successful fabrication of a patterned anode and electrolyte on a support can be challenging aspects of this type of ISOFC processing. Additional steps involve simple slurry painting and relatively low temperature sintering, using techniques well-known to those in the art.

An ISOFC of this invention can, preferably, have a ceramic interconnect, such as $LaCrO_3$. However, an Ag paste can also be used as the interconnect for purposes of illustration. Above ≈600° C., this material sinters to a high density, providing a good gas seal. It is easily painted onto an ISOFC. A cathode typically comprises standard SOFC materials: $(La,Sr)MnO_3$ (LSM) or $(La,Sr)(Co,Fe)O_3$ (LSCF), as can be applied by painting followed by relatively low temperature sintering.

Example 17

The centrifugal casting techniques demonstrated in examples 14-15 are further illustrated. For use as a support, Ni-YSZ anode substrates were made according to prior art procedures, mixing YSZ powder (Tosoh) and NiO powder (Baker) in a weight ratio of 1:1. The powder was mixed with acetone and ball milled for about 30 hrs. 6 wt % starch was then added to the mixed powders, which were ball milled for another 2 hrs before being dried and pressed into pellets. The pellet diameter was 20 mm and thickness was 0.5 mm. An initial calcining was done at 1000° C. for 6 hours.

Likewise, as described above, a ceramic electrolyte is deposited on a support. A stable YSZ suspension or slurry can be, for instance, prepared by mixing 1 gram of YSZ powder (Tosoh) with 200 ml ethanol and sonicating for 1 hour. In some cases, water can be used. The Ni-YSZ substrates supports were placed in vessels with flat bottoms and 10 mL of the slurry added along with 10 mL of ethanol (or water). The vessels were then placed in a centrifuge with a radius of 25 cm, and the centrifuge was operated for a time and at a rate sufficient to adequately deposit the electrolyte. In this example, the centrifuge was run for 30 min at 1500 rpm. In the centrifugal field, the ceramic particles in the suspension are deposited or forced down to the surface of the substrate to form a coating—the supernatant was clear after the centrifuge process. After decanting the supernatant, the wet green body was allowed to dry. The coated supports were dried in open air for about 4 hours (or more than 8 hours for water based slurry), then sintered in air at 1000° C. for 4 hours and then at 1400° C. for 4 hours. Similar quality coatings were obtained with water and ethanol.

Cells can be constructed, as described herein or would otherwise be known in the art to further characterize and test the electrolyte depositions of examples 14-15 and 17.

Example 18

To that effect, $La_{0.6}Sr_{0.4}Co_{0.2}Fe_{0.8}O_3$ (LSCF)—$Ce_{0.9}Gd_{0.1}O_{1.95}$ (GDC) cathodes were prepared by mixing LSCF powder (Praxair) with GDC powder (NexTech) in the weight ratio of 1:1. For purposes of comparison, $La_{0.8}Sr_{0.2}MnO_3$ (LSM)-YSZ cathodes were prepared by mixing LSM powder (Praxair) with YSZ powder (TOSOH), also in the weight ratio of 1:1. For both cathodes, a screen printing vehicle (Heraeus V737) was added to the mixed powder to make a slurry. The slurry was applied onto the YSZ electrolyte coating side of the aforementioned support then fired at 400° C. for 2 h to burn out the binder. Then, a second layer of the cathode slurry was applied, followed again by burnout at 400° C. for 2 h. In order to obtain good current collection, two more layers of pure LSCF (or LSM) were applied on top of a Pt mesh, that became embedded in the cathode. Finally, the respective composites were sintered: at 900° C. for 3 hrs, for LSCF-GDC, and 1100° C. for 3 hrs for LSM-YSZ. The cathode area for each was 0.5 $cm^2$.

The anode sides of the cells were attached and sealed to one end of alumina tubes by applying silver paste (DAD-87, Shanghai Research Institute of Synthetic Resin). Cell tests were carried out by flowing $H_2$+3% $H_2O$ at 30 ml/min to the anode side while the cathode was exposed to ambient air. Impedance measurements were carried out during cell tests using a Solartron-1260 Impedance Analyzer. The frequency range was 1-$10^6$ Hz. SEM images were obtained in a Hitachi 3500 microscope.

Example 19

Figure 16:
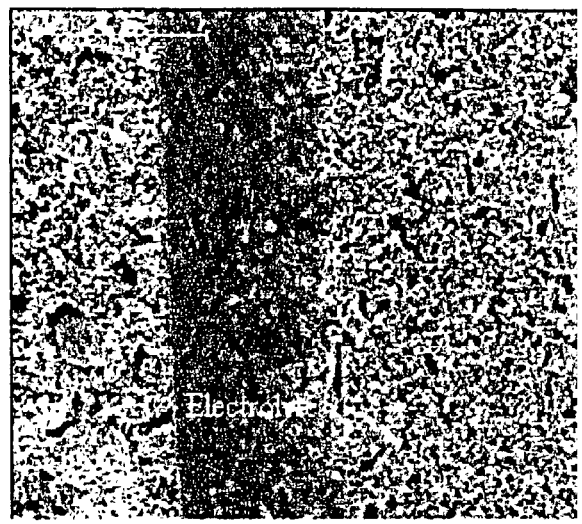
FIG. 16 provides a cross sectional SEM image of a SOFC with a LSM-YSZ cathode.

FIG. 16 shows a fracture cross-sectional SEM image of a SOFC with a LSM-YSZ cathode after cell testing. It can be clearly seen that the centrifugal cast YSZ coating of this invention is dense, with a thickness of 25 µm. The anode support shows a good uniform porosity. At the interface of the electrolyte and the anode, the contact is very good. The cathode is also porous but shows some large pores along with a finer-scale porosity. The cathode thickness was somewhat non-uniform.

Example 20

Figure 17:
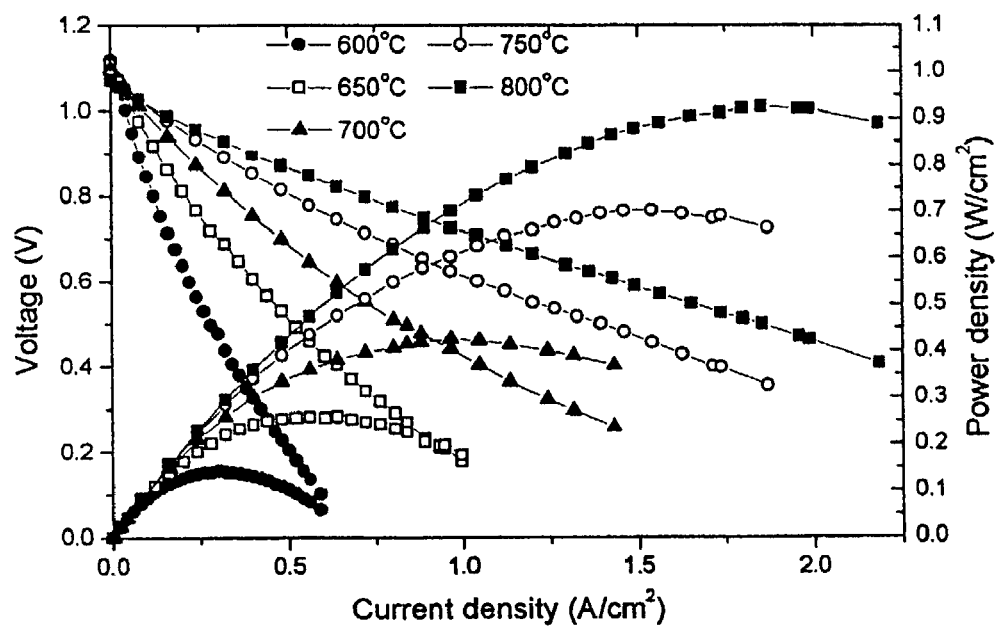
FIG. 17 plots graphically voltage and power density versus current density for the cell with a LSCF-GDC cathode (operated using humidified hydrogen).

FIG. 17 shows the performance (hydrogen fuel) of an anode supported SOFC with a LSCF-GDC cathode. The measured open circuit voltage (OCV) was within 30 mV of the value predicted using the Nernst equation, indicating that the deposited YSZ electrolyte was fully dense and free of pinholes. The maximum power density of this SOFC was 0.93 W/$cm^2$ at 800° C. The I-V curves showed positive curvature, particularly at lower temperatures. This is similar to prior art literature reports on anode supported cells operated on hydrogen. A detailed study of anode supported cells has shown that cell power densities are limited by electrode activation and/or concentration polarization. The fact that negative curvature is not observed in FIG. 1 is partly due to the fact that the current was not measured beyond 2 A/$cm^2$, but also indicates that the Ni-YSZ anode supports had reasonably high porosity. The cell performed stably for 90 hrs at 700° C. at 0.6V and 0.35 W/$cm^2$, and was still working well when the test was stopped.

Example 21

Figure 18:
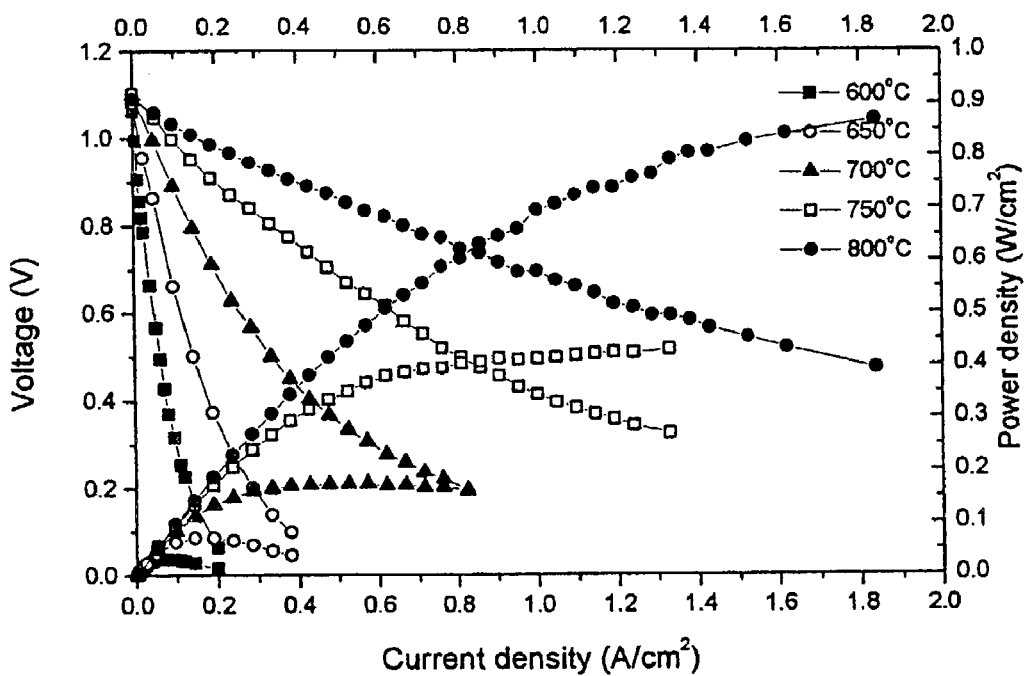
FIG. 18 plots graphically voltage and power density versus current density for the cell with a LSM-YSZ cathode (operated using humidified hydrogen).
Figure 19:
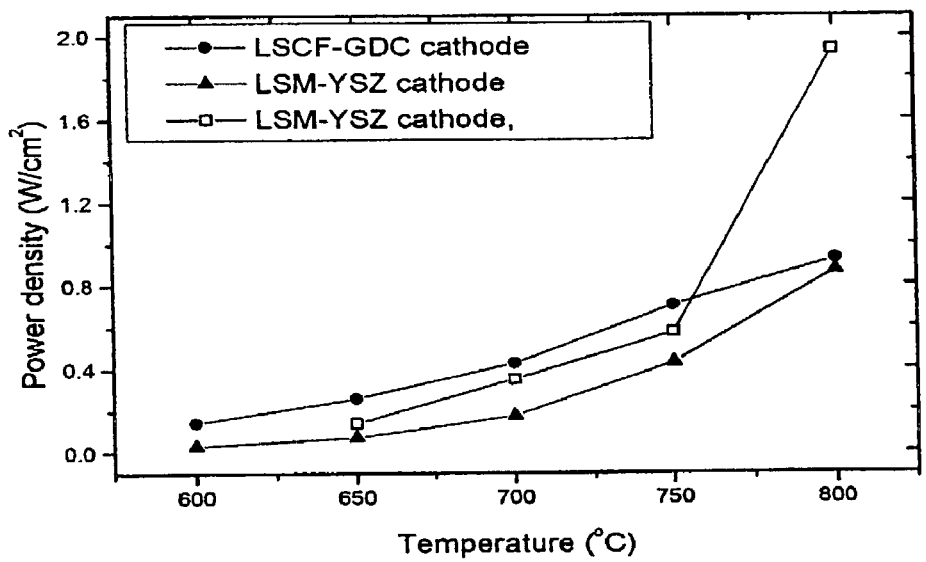
FIG. 19 compares the present maximum power density results with literature data.

FIG. 18 shows the performance (hydrogen fuel) of a SOFC using LSM-YSZ as the cathode. The maximum power densities were slightly higher for LSM-YSZ than for LSCF-GDC, e.g. 0.88 W/$cm^2$ at 800° C. This is somewhat surprising given that a number of impedance spectroscopy studies have indicated that LSCF and LSCF-GDC provide substantially lower low-current polarization resistance than LSM-YSZ. FIG. 19 compares the maximum power densities for the present SOFCs with those attainable using cells (Y) of the prior art. It can be seen that the present cells provide comparable or somewhat lower power densities than these prior reports.

Example 22

Figure 20:
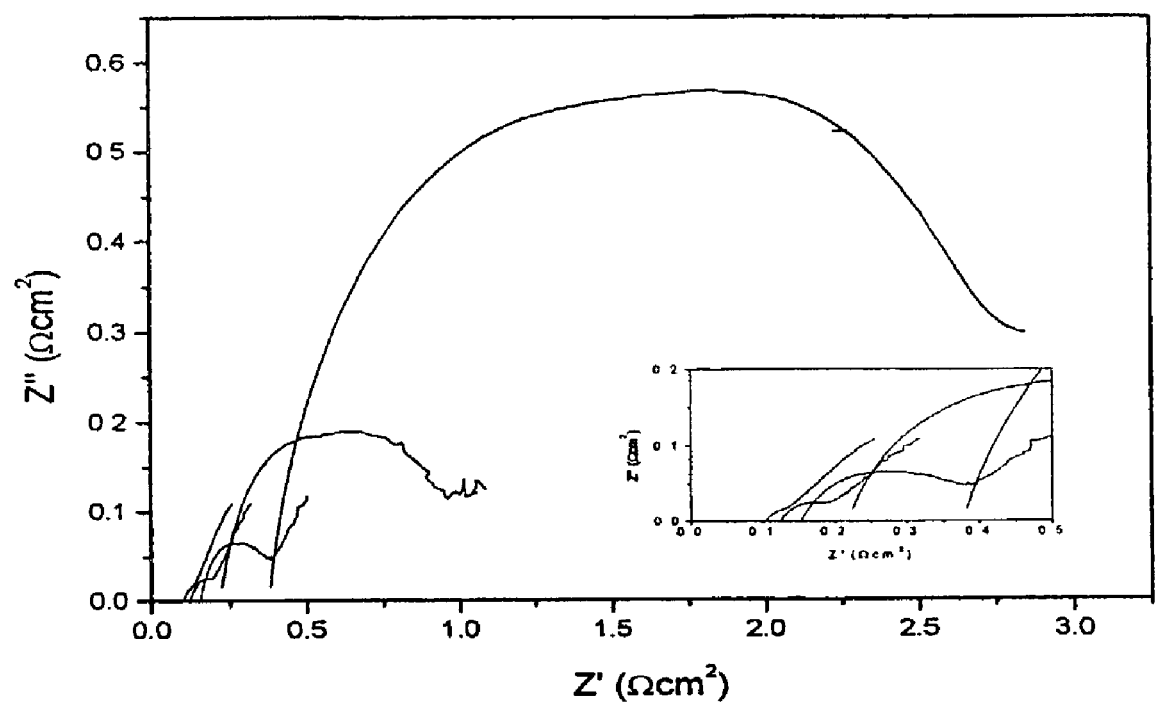
FIG. 20 compares impedance spectra from a cell with a LSCF-GDC cathode at different temperatures (operated using humidified hydrogen).

Impedance spectra taken during a cell test (hydrogen fuel) at open circuit are shown in FIG. 20. The semi-circular plots, representing the combined anode and cathode interfacial resistances, decreased rapidly in size with increasing temperature, as expected. The left real-axis intercepts of the semi-circles, representing the ohmic losses in the cell tests (given in Table 1), also decreased with increasing temperature. As can be seen from Table 1, the resistance loss of the SOFC mainly came from polarization (>80%), even though the electrolyte thickness was relatively large, 25 µm. As discussed previously, this loss is believed to arise primarily from the cathode. The ohmic resistance measured from the impedance data agrees fairly well with the known resistivity of YSZ. For example, at 800° C. the impedance data yields 0.11 $\Omega$ $cm^2$. Given the deposited YSZ coating thickness of 25 µm, this corresponds to a conductivity of 0.23 S/cm. This compares reasonably well with literature YSZ conductivity values at 800° C. of 0.055 and 0.02 $Scm^{-1}$. Also shown in Table 1 is the low-current cell resistance obtained from the slope of the I-V characteristics in FIG. 17. This total cell resistance, which includes both the ohmic resistances and interfacial polarization losses, agrees well with the sum of these resistances measured from the impedance data.

TABLE 1

The resistance distribution of the fuel cell

| Temperature (° C.) | 600 | 650 | 700 | 750 | 800 |
|---|---|---|---|---|---|
| $R_{wc}$ ($\Omega cm^2$)[a] | 2.9 | 1.8 | 1.2 | 0.77 | 0.63 |
| $R_{ohmic}$ ($\Omega cm^2$)[c] | 0.38 | 0.22 | 0.16 | 0.13 | 0.11 |
| $R_{interface}$ ($\Omega cm^2$)[d] | 2.52 | 1.58 | 1.04 | 0.64 | 0.52 |

\*\*\*

The results of examples 17-22 show that conventional SOFCs can be prepared using centrifugal casting of YSZ electrolytes, in particular on Ni-YSZ anodes/supports. After application of a suitable cathode, the SOFC performance is comparable to that of similar cells prepared using other methods. Resistance loss analysis based on impedance spectroscopy indicated that the main loss came from polarization. The performance of SOFCs with LSCF-GDC and LSM-YSZ cathodes was similar.

While other colloidal processing methods are available, there are some potential advantages of the present centrifuge technique. High initial coating packing density and low defect are realized due to the centrifugal force, so that high quality coatings are reliably obtained without the need for a clean room environment. Water or alcohols can be used to make the suspensions, and the raw materials are used efficiently, so the process is environmentally friendly. The technique is simple, fast, and economical. The coating thickness can be easily and accurately controlled over a large dimensional range.

Example 23

Cells were prepared and tested as would be known in the art. Conventional Ni-YSZ anode substrates can be fabricated, as described above, by mixing YSZ powder (Tosoh) and NiO powder (Baker) in a weight ratio of 1:1 and pressing the mixed power into pellets with diameter of 20 mm and thickness of 0.5 mm. An initial calcining was done at 1000° C. for 6 hours. The YSZ electrolyte layer was deposited by the centrifugal casting process of this invention, then sintered at 1400° C. for 4 hours. The resulting YSZ thickness was ≈25 µm.

Two kinds of cathodes were, again, used. $La_{0.8}Sr_{0.2}MnO_3$ (LSM)-YSZ cathodes were prepared by mixing LSM powder (Praxair) with YSZ powder (TOSOH) in the weight ratio of 1:1. $La_{0.6}Sr_{0.4}Co_{0.2}Fe_{0.8}O_3$ (LSCF)—$Ce_{0.9}Gd_{0.1}O_{1.95}$ (GDC) cathodes were prepared by mixing LSCF powder (Praxair) with GDC powder (NexTech), also in the weight ratio of 1:1. A slurry was prepared by combining the mixed powders with a binder (Heraeus V737), and applying it to the YSZ electrolyte. A Pt mesh current collector was embedded in the cathode. Finally, the cathodes were sintered at 900° C. for 3 hrs for LSCF-GDC, and at 1250° C. for 1 hr for LSM-YSZ. The cathode area for each cell was 0.5 $cm^2$.

The anode sides of the cells were attached to alumina tubes and sealed by applying silver paste (DAD-87, Shanghai Research Institute of Synthetic Resins). Cell tests were carried out by flowing humidified (3% $H_2O$) fuel, either pure methane or natural gas, at ≈30 ml/min to the anode side. The cathode was exposed to ambient air.

Example 24

Figure 21:
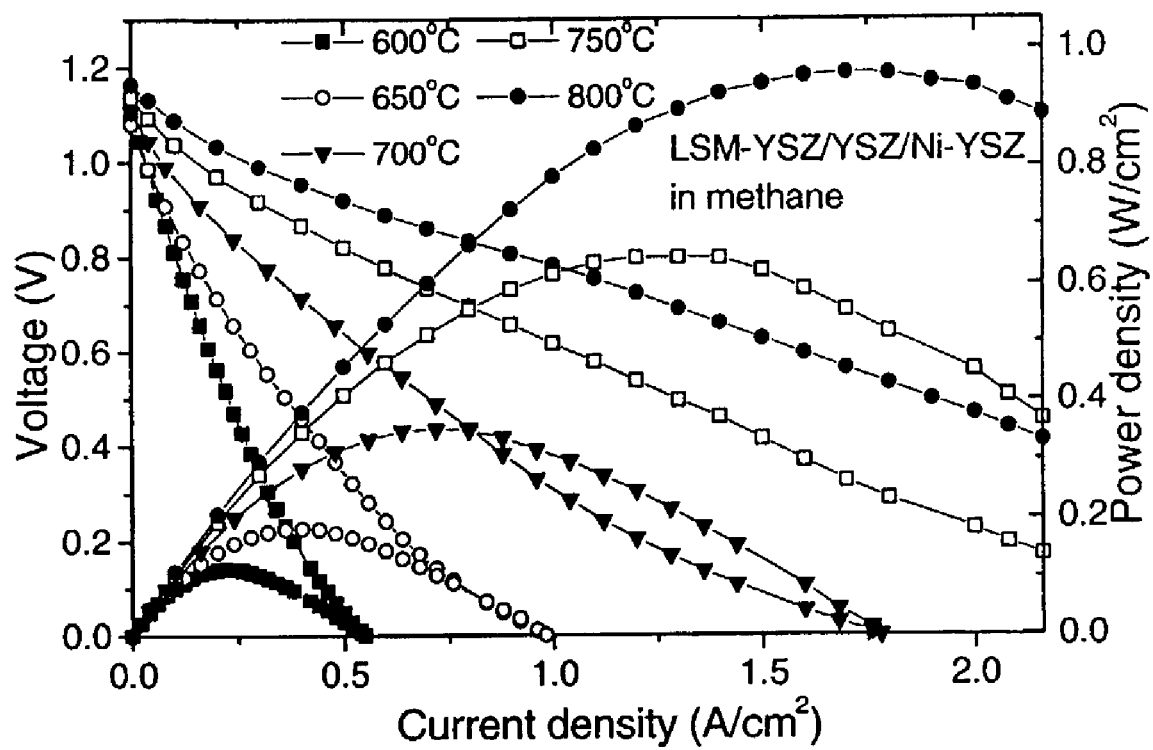
FIG. 21 plots voltage and power density versus current density measured with humidified methane fuel, for a SOFC with LSM-YSZ cathode.
Figure 22:
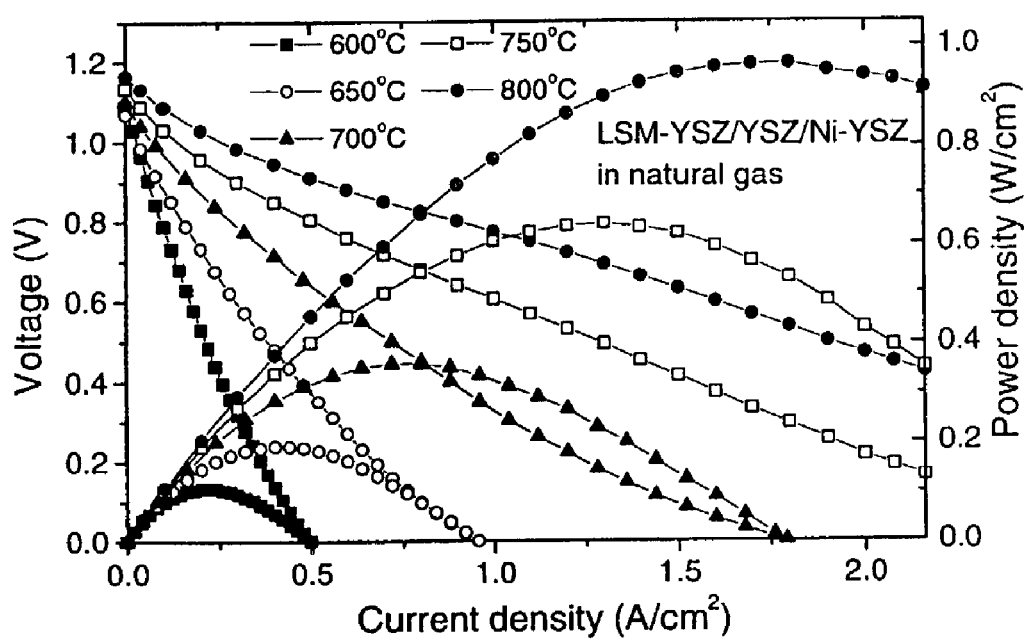
FIG. 22 plots voltage and power density versus current density measured with humidified natural gas fuel, for a SOFC with LSM-YSZ cathode.

FIGS. 21 and 22 show the performance of SOFCs with LSM-YSZ cathodes in humidified methane and natural gas, respectively, taken in the first few hours of operation. Open circuit voltages increased from ≈1.1 to 1.17V with increasing temperature. Table 2 shows the power densities at 0.7V for these cells, and a similar cell with a LSCF-GDC cathode, for hydrogen, methane, and natural gas. (See, also, the comparative data of example 6, demonstrating use of a conventional Ni-YSZ SOFC in conjunction with a hydrocarbon fuel.) Power densities for methane and natural gas were similar, and ≈10% lower than for hydrogen. The highest power density obtained with methane was 0.96 W/$cm^2$ at 800° C., for the cell shown in FIG. 21. The maximum power densities were similar for SOFCs with LSM-YSZ and LSCF-GDC cathodes, and dropped with decreasing temperature.

TABLE 2

Power density at 0.7 V for SOFCs with LSM-YSZ and LSCF-GDC cathodes in hydrogen, methane, and natural gas

| T(C) | LSM-YSZ | | | LSCF-GDC | |
|---|---|---|---|---|---|
| | $H_2$ | $CH_4$ | Natural Gas | $H_2$ | $CH_4$ |
| 600 | 0.12 | 0.10 | 0.09 | 0.12 | 0.08 |
| 650 | 0.30 | 0.15 | 0.15 | 0.21 | 0.15 |
| 700 | 0.45 | 0.29 | 0.29 | 0.33 | 0.28 |
| 750 | 0.62 | 0.55 | 0.52 | 0.53 | 0.47 |
| 800 | 0.86 | 0.89 | 0.89 | 0.75 | 0.73 |

Example 25

The I-V curves showed positive curvature, particularly at lower temperatures, similar to reports of anode-supported cells operated on hydrogen. A prior art study of anode supported cells run with hydrogen showed that cell power densities can be limited by a number of factors, including concentration polarization. J. W. Kim, A. V. Virkar, K. Z. Fung, K. Mehta, and S. C. Singhal, J. Electrochem. Soc., 146 (1) 69-78 (1999). The modest decrease in cell power density for methane relative to hydrogen may be related to the higher mass of methane molecules, which yields slower gas-phase diffusion and increased concentration polarization. Note, however, that each methane molecule reacts with four times as many oxygen ions as each hydrogen molecule: less methane gas-phase diffusion is needed to yield the same cell current. Another possible explanation is a higher polarization resistance associated with slower electrochemical oxidation of methane versus hydrogen.

Example 26

Figure 23:
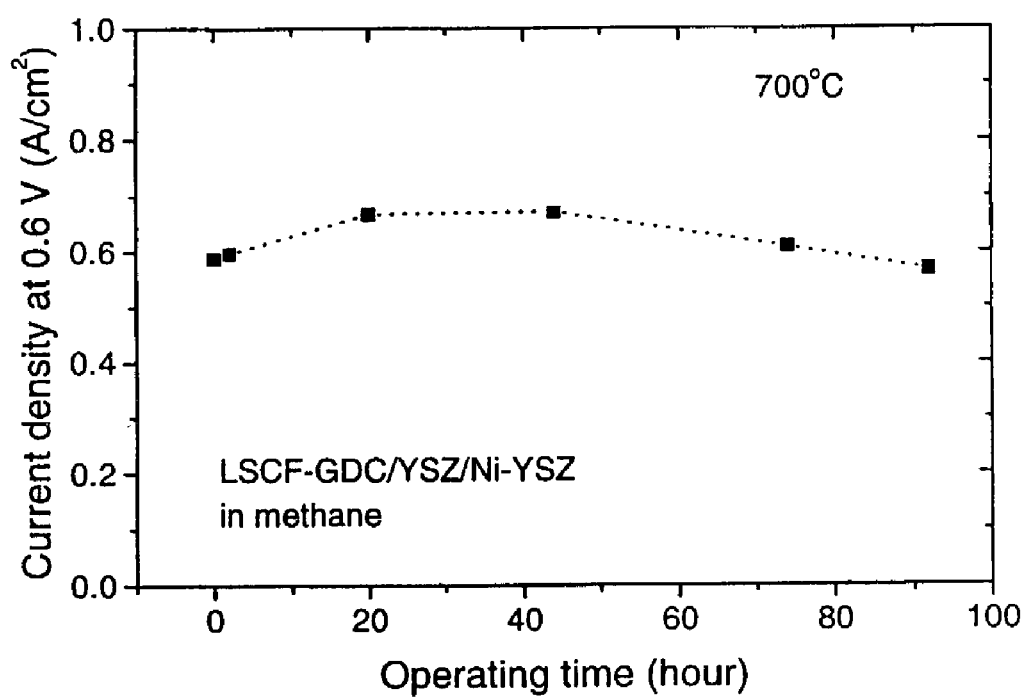
FIG. 23 plots current density at 0.6V versus time for a SOFC with a LSCF-GDC cathode operated at 700° C. using methane.

The cells showed good stability with methane and natural gas. A cell with a LSCF-GDC cathode was operated for >90 hours with methane, before the test was stopped with the cell still running well. FIG. 23 shows current density versus time. The cell was kept at 0.6V and 700° C. for most of the test, and the current density was in the range from 0.6-0.67 A/$cm^2$. The power density increased slightly during the first ≈20 hours of the test, and then stabilized for ≈20 hours before decreasing slightly over the last 50 hours. There were frequent breaks during the test when current-voltage characteristics were measured at different temperatures. During the test operation, fuel flow was accidentally stopped for ≈10 min. While the cell recovered to nearly its initial performance, the onset of the gradual decrease in performance coincided with this event.

Another SOFC with a LSM-YSZ cathode was operated in humidified natural gas for >40 h at 0.6V. The natural gas performance was similar to that for methane, showing an initial increase and then a gradual decrease, with a current density of ≈0.5 A/$cm^2$.

Example 27

Figure 24:
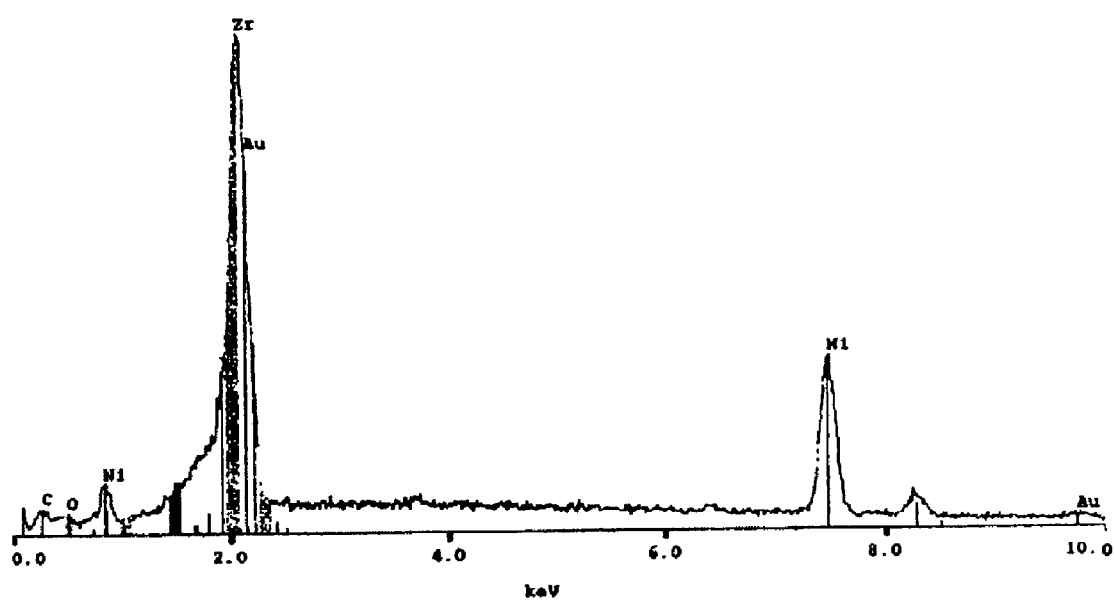
FIG. 24 shows an SEM-EDX spectrum taken from the surface of a Ni-YSZ anode after testing in methane at 700° C. for 90 hours.

After these tests, SEM-EDX measurements taken at various points on the Ni-YSZ anodes showed only very small C peaks. FIG. 24 shows a typical result obtained after the test shown in FIG. 23. A small C peak is present; for comparison, anodes with visible carbon yielded a peak that was comparable in size to the Zr peak. For natural gas, carbon was observed visually on the Pt paint used to attach the current collector wires to the anode.

While the cells were quite stable in methane during operation, there were some conditions seemed to induce carbon deposition. For example, at 800° C. and open circuit condition, carbon deposition presumably caused the cell to crack after ≈10 mins. In general, it was found that the cells could be kept at open-circuit conditions for >10 minutes at 700° C., and longer times at lower temperatures, without deleterious effect. This is in reasonable agreement with measurements showing that the carbon deposition rate on Ni-YSZ becomes quite low below ≈650° C., and confirms coking as a potential problem for direct-methane operation of anode-supported SOFC stacks, especially if the operating temperature is above ≈700° C. C. M. Finnerty, N. J. Coe, R. H. Cunningham, and R. M. Ormerod, Catalysis Today 46 (1998) 137.

Example 28

Figure 25:
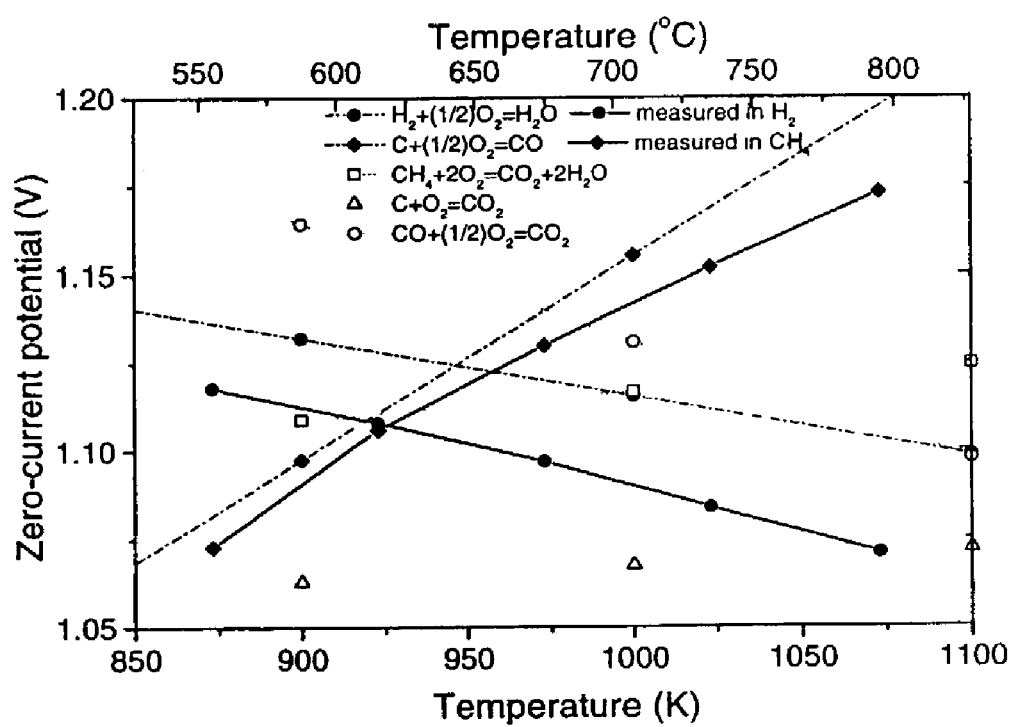
FIG. 25 plots open circuit voltages measured in both humidified hydrogen and methane, for a SOFC with LSCF-GDC cathode. Shown for comparison are values calculated using the Nernst equation assuming different anode reactions.

Open circuit voltages (OCV) versus temperature, measured from the cell test results with hydrogen and methane, are plotted in FIG. 25. The OCV values for methane increased linearly with increasing temperature. For comparison, the same cell operated with humidified hydrogen showed the expected OCV decrease with increasing temperature. The experimental result for hydrogen is ≈25 mV lower than the theoretical prediction shown, presumably due to experimental effects such as leakage at the seals. The theoretical OCV calculated from the Nernst equation, assuming a number of different possible methane electrochemical reactions, is also shown for comparison in FIG. 25. Possible reactions considered include direct electrochemical oxidation of methane, or the oxidation of $H_2$, CO, or solid C produced by initial reactions such as reforming or methane cracking. In the calculation, the partial pressures of $CH_4$ and $H_2$ were taken to be 1 atm, while the partial pressures of CO, $CO_2$, and $H_2O$ were taken to be 0.03 atm. (This assumption most likely overestimates the partial pressures of CO and $CO_2$, since they were not intentionally added to the fuel. Note, for example, that a factor-of-10 lower CO partial pressure would lead to a predicted OCV ≈40 mV higher than shown in FIG. 24 for $C+1/2O_2=CO$.) Without limitation to any one theory or mode of operation, the OCV versus temperature data agrees well with the prediction for partial oxidation of C. While there is uncertainty in the predicted absolute OCV values as noted above, it is clear that only C partial oxidation yields a slope near that observed experimentally. While the results in FIG. 25 are interesting, more evidence is needed before making a definitive conclusion about any particular reaction mechanism.

Example 29

The data and results of the preceding examples are reasonably consistent with prior work on direct methane SOFCs. The OCV of 1.1 to 1.17 V measured at 600-800° C. is between the values measured at 1000° C., 1.2V, and at 550-650° C., 1.05V. See, respectively, K. Ukai, Y. Mizutani, Y. Kume, and O. Yamamoto, in: H. Yokokawa, S. C. Singhal (Eds.), Solid Oxide Fuel Cells VII, Electrochemical Society, Pennington, N.J., 2001, p. 375 and E. P. Murray, T. Tsai, and S. A. Barnett, Nature 400 (1999) 649. The present power densities are the highest reported for a YSZ thin electrolyte SOFC operated with methane at ≦800° C., but are lower than the value reported at 1000° C. for a thick SOFC electrolyte SOFC, 2.0 $W/cm^2$. Prior work on thin electrolyte SOFCs operated with methane was done at lower temperatures, so it is not surprising that the present power densities are higher. The present invention demonstrates that Ni-based anodes can be used substantially without deleterious coking at higher temperature, preferably with a substantial current flowing through the cells.

While the principles of this invention have been described in connection with specific embodiments, it should be understood clearly that these descriptions, along with the chosen figures, charts, graphics, and data therein, are made only by way of example and are not intended to limit the scope of this invention, in any manner. For example, the inventive anodes and related cellular components have been shown as utilized with various hydrocarbons; however, as would be well-known to those skilled in the art and made aware of this invention, the methods described herein can also be utilized with various other higher molecular weight hydrocarbon stocks or reaction systems. Likewise, while certain ceria and/or electrolyte materials have been described herein, others can be used alone or in combination and with or without various dopants to achieve the same or similar effect. While various parameters, such as temperature and concentrations, have been described in conjunction with the construction, fabrication and/or operation of various fuel cells and their components, the same parameters can be varied in order to achieve oxidation rates and/or power densities comparable to those described herein. Other advantages and features of this invention will become apparent on the following claims, with the scope thereof determined by the reasonable equivalents, as would be understood by those skilled in the art.

The invention claimed is:

1. A method of using a hydrocarbon fuel to operate a solid oxide fuel cell, said method comprising:
   providing a solid oxide fuel cell having an anode absent ceria, said anode comprising a catalytic metal for cracking hydrocarbons, said metal selected from Pt, Ru, Pd, Fe, Co and Ni; and
   introducing a hydrocarbon fuel to said anode, said fuel absent at least one of sufficient carbon dioxide and water sufficient to convert said hydrocarbon fuel to hydrogen, said method substantially absent a hydrocarbon reforming stage.

2. The method of claim 1 wherein said hydrocarbon fuel is selected from the group consisting of about $C_1$ to about $C_{10}$ hydrocarbons and combinations thereof.

3. The method of claim 2 wherein said fuel comprises methane.

4. The method of claim 2 wherein said fuel is a natural gas comprising a combination of hydrocarbons.

5. The method of claim 1 wherein said metal comprises nickel.

6. The method of claim 5 wherein said anode is a composite of nickel and a doped zirconia.

7. The method of claim 6 wherein said anode is a composite of nickel and yttria-stabilized zirconia.

8. The method of claim 7 wherein said cell further includes a yttria-stabilized zirconia electrolyte on said anode.

9. The method of claim 8 wherein said solid oxide fuel cell is operated at temperatures less than about 800° C.

10. The method of claim 1 wherein said anode and said cell are arranged in a stack of said cells.

11. A method of using a hydrocarbon fuel to increase the open circuit voltage of a solid oxide fuel cell, said method comprising:
    providing a solid oxide fuel cell having an anode absent ceria, said anode comprising a metal catalytic for hydrocarbon cracking, said metal selected from Pt, Ru, Pd, Fe, Co and Ni;
    introducing a hydrocarbon fuel to said anode to operate said cell, substantially absent hydrocarbon reforming; and
    increasing the operating temperature of said cell above about 600° C.

12. The method of claim 11 wherein said hydrocarbon fuel is selected from the group consisting of about $C_1$ to about $C_{10}$ hydrocarbons and combinations thereof.

13. The method of claim 12 wherein said fuel comprises methane.

14. The method of claim 12 wherein said fuel is a natural gas comprising a combination of hydrocarbons.

15. The method of claim 11 wherein said anode is a composite of nickel and a doped zirconia.

16. The method of claim 15 wherein said anode is a composite of nickel and yttria-stabilized zirconia.

* * * * *

UNITED STATES PATENT AND TRADEMARK OFFICE
CERTIFICATE OF CORRECTION

PATENT NO. : 7,482,077 B2 Page 1 of 1
APPLICATION NO. : 10/277167
DATED : January 27, 2009
INVENTOR(S) : Scott A. Barnett and Jiang Liu It is certified that error appears in the above-identified patent and that said Letters Patent is hereby corrected as shown below:

Col. 1, Line 9 (second paragraph to be inserted)
--The United States Government has certain rights to this invention pursuant to Grant No. DE-FG26-00NT40814 from the Department of Energy to Northwestern University.--

Signed and Sealed this

Sixteenth Day of June, 2009

JOHN DOLL
*Acting Director of the United States Patent and Trademark Office*